US012770329B2

(12) United States Patent
Liu

(10) Patent No.: US 12,770,329 B2
(45) Date of Patent: Oct. 20, 2026

(54) IMAGE RENDERING METHOD AND APPARATUS, DEVICE, AND MEDIUM

(71) Applicant: Tencent Technology (Shenzhen) Company Limited, Shenzhen (CN)

(72) Inventor: Jinbiao Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 161 days.

(21) Appl. No.: 18/586,377

(22) Filed: Feb. 23, 2024

(65) Prior Publication Data

US 2024/0212282 A1 Jun. 27, 2024

Related U.S. Application Data

(63) Continuation of application No. PCT/CN2023/087215, filed on Apr. 10, 2023.

(30) Foreign Application Priority Data

May 20, 2022 (CN) ......................... 202210549234.6

(51) Int. Cl.
*G06T 17/20* (2006.01)
*G06T 3/067* (2024.01)
*G06V 10/25* (2022.01)

(52) U.S. Cl.
CPC .............. *G06T 17/20* (2013.01); *G06T 3/067* (2024.01); *G06V 10/25* (2022.01)

(58) Field of Classification Search
None
See application file for complete search history.

(56) References Cited

U.S. PATENT DOCUMENTS 9,665,800 B1 5/2017 Kuffner, Jr.
11,640,485 B1 * 5/2023 Seibold .................. G06T 17/20 703/1

(Continued)

FOREIGN PATENT DOCUMENTS

CN 109215106 A 1/2019
CN 112509106 A 3/2021

(Continued)

OTHER PUBLICATIONS

GharehTappeh, Zohreh Sohrabi, and Qingjin Peng. "Simplification and unfolding of 3D mesh models: review and evaluation of existing tools." Procedia Cirp 100 (2021): 121-126.*

(Continued)

*Primary Examiner* — Sultana M Zalalee
(74) *Attorney, Agent, or Firm* — Morgan, Lewis & Bockius LLP

(57) ABSTRACT

This application relates to an image rendering method performed by a computer device, and further relates to the field of gaming technologies. The method includes: flattening an original object mesh model to obtain a flat mesh model, the original object mesh model being an original three-dimensional mesh model of a target virtual object; generating a patch model according to a bounding box patch of the flat mesh model; performing topological reconstruction on the patch model, to obtain a reconstructed mesh model, a quantity of surfaces of the reconstructed mesh model being less than a quantity of surfaces of the original object mesh model; and reconstructing a three-dimensional mesh model based on the reconstructed mesh model.

18 Claims, 17 Drawing Sheets

(56) References Cited

U.S. PATENT DOCUMENTS

| | | | | |
|---|---|---|---|---|
| 2002/0004710 | A1* | 1/2002 | Murao | G06F 16/29 702/167 |
| 2003/0185420 | A1* | 10/2003 | Sefcik | G06V 10/255 382/103 |
| 2007/0291050 | A1* | 12/2007 | Bruderlin | G06T 19/00 345/606 |
| 2009/0195541 | A1* | 8/2009 | Peng | G06T 15/005 345/420 |
| 2013/0293541 | A1* | 11/2013 | Maisonneuve | G06T 17/205 345/420 |
| 2015/0230874 | A1* | 8/2015 | Musuvathy | G06T 17/20 703/1 |
| 2017/0011492 | A1* | 1/2017 | Thunström | G06F 3/013 |
| 2021/0005006 | A1* | 1/2021 | Oh | H04N 21/85406 |
| 2021/0096726 | A1* | 4/2021 | Faulkner | G06F 3/017 |
| 2021/0183110 | A1* | 6/2021 | Zhang | H04N 19/20 |
| 2021/0295603 | A1* | 9/2021 | Lui | G06T 19/006 |
| 2022/0012497 | A1* | 1/2022 | Hajmohammadi | G06V 20/20 |
| 2022/0067242 | A1* | 3/2022 | Mukherjee | G06T 17/205 |
| 2022/0096933 | A1* | 3/2022 | Raymond | G06T 15/005 |
| 2022/0108482 | A1* | 4/2022 | Graziosi | G06T 9/001 |
| 2022/0164994 | A1* | 5/2022 | Joshi | G06T 9/001 |
| 2022/0353532 | A1* | 11/2022 | Zakharchenko | H04N 19/132 |
| 2023/0149813 | A1* | 5/2023 | Kohler | G06T 15/04 463/31 |

FOREIGN PATENT DOCUMENTS

| | | | |
|---|---|---|---|
| CN | 113178014 | A | 7/2021 |
| DE | 102019100011 | A | 7/2020 |

OTHER PUBLICATIONS

Wang, Peng-Shuai, et al. "Adaptive O-CNN: A patch-based deep representation of 3D shapes." ACM Transactions on Graphics (TOG) 37.6 (2018): 1-11.*

Marco Attene, Marcel Campen, and Leif Kobbelt. 2013. Polygon mesh repairing: An application perspective. ACM Comput. Surv. 45, 2 (2013), 15:1-15:33.*

Sellers, G., Obert, J., Cozzi, P., Ring, K., Persson, E., de Vahl, J., & van Waveren, J. M. P. (2013). Rendering massive virtual worlds. In ACM SIGGRAPH 2013 Courses (pp. 1-88).*

Tencent Technology, ISR, PCT/CN2023/087215, Jul. 7, 2023, 2 pgs.

* cited by examiner

| | | | | | | | | | | | | | | | |
|---|---|---|---|---|---|---|---|---|---|---|---|---|---|---|---|
| A | 2 | A | 4 | A | 6 | A | 8 | A | 10 | A | 12 | A | 14 | A | 16 |
| 1 | B | 3 | B | 5 | B | 7 | B | 9 | B | 11 | B | 13 | B | 15 | B |
| C | 2 | C | 4 | C | 6 | C | 8 | C | 10 | C | 12 | C | 14 | C | 16 |
| 1 | D | 3 | D | 5 | D | 7 | D | 9 | D | 11 | D | 13 | D | 15 | D |
| E | 2 | E | 4 | E | 6 | E | 8 | E | 10 | E | 12 | E | 14 | E | 16 |
| 1 | F | 3 | F | 5 | F | 7 | F | 9 | F | 11 | F | 13 | F | 15 | F |
| G | 2 | G | 4 | G | 6 | G | 8 | G | 10 | G | 12 | G | 14 | G | 16 |
| 1 | H | 3 | H | 5 | H | 7 | H | 9 | H | 11 | H | 13 | H | 15 | H |
| I | 2 | I | 4 | I | 6 | I | 8 | I | 10 | I | 12 | I | 14 | I | 16 |
| 1 | J | [illegible] | J | 5 | J | 7 | J | 9 | J | 11 | J | 13 | J | 15 | J |
| K | 2 | K | 4 | K | 6 | K | 8 | K | 10 | K | 12 | K | 14 | K | 16 |
| 1 | L | 3 | L | 5 | L | 7 | L | 9 | L | 11 | L | 13 | L | 15 | L |
| M | 2 | M | 4 | M | 6 | M | 8 | M | 10 | M | 12 | M | 14 | M | 16 |
| 1 | N | 3 | N | 5 | N | 7 | N | 9 | N | 11 | N | 13 | N | 15 | N |
| O | 2 | O | 4 | O | 6 | O | 8 | O | 10 | O | 12 | O | 14 | O | 16 |
| 1 | P | 3 | P | 5 | P | 7 | P | 9 | P | 11 | P | 13 | P | 15 | P |

1601 1602 1603

1604 1605 1606

IMAGE RENDERING METHOD AND APPARATUS, DEVICE, AND MEDIUM

CROSS-REFERENCE TO RELATED APPLICATIONS

This application is a continuation application of PCT Patent Application No. PCT/CN2023/087215, entitled "IMAGE RENDERING METHOD AND APPARATUS, DEVICE, AND MEDIUM" filed on Apr. 10, 2023, which claims the priority to Chinese patent application No. 2022105492346, entitled "IMAGE RENDERING METHOD AND APPARATUS, DEVICE, AND MEDIUM" filed with the China National Intellectual Property Administration on May 20, 2022, all of which is incorporated herein by reference in its entirety.

FIELD OF THE TECHNOLOGY

This application relates to the field of image rendering technologies, and more to gaming technologies, and in particular, to an image rendering method and apparatus, a device, and a medium.

BACKGROUND OF THE DISCLOSURE

In a virtual scene, to ensure rendering effect of a virtual object, most models for rendering the virtual object include a large quantity of surfaces. For example, in a game scene, to ensure rendering effect of a virtual tree, most models for rendering the virtual tree include a large quantity of surfaces. Larger quantity of surfaces can carry more model details, thereby ensuring that the virtual object obtained by rendering is more vivid and realistic. However, the larger quantity of surfaces a model has, the more rendering resources the model occupies during rendering.

In a conventional technology, direct surface reduction is generally performed on the model. By performing direct surface reduction on the model, the quantity of surfaces of the model is reduced, and the rendering resources can be reduced during rendering. However, direct surface reduction may cause a serious loss of the model details, causing the virtual object obtained by rendering to be less vivid and realistic, resulting in poor image rendering effect.

SUMMARY

In view of this, for the foregoing technical problems, it is necessary to provide an image rendering method and apparatus, a device, and a medium.

According to a first aspect, this application provides an image rendering method, performed by a computer device, the method including:

- flattening an original object mesh model to obtain a flat mesh model, the original object mesh model being an original three-dimensional mesh model of a target virtual object;
- generating a patch model according to a bounding box patch of the flat mesh model;
- performing topological reconstruction on the patch model, to obtain a reconstructed mesh model, a quantity of surfaces of the reconstructed mesh model being less than a quantity of surfaces of the original object mesh model; and
- reconstructing a three-dimensional mesh model based on the reconstructed mesh model.

According to a second aspect, this application provides a computer device, including a memory and one or more processors, the memory storing computer-readable instructions that, when executed by the one or more processors, cause the computer device to perform the aforementioned image rendering method.

According to a third aspect, this application provides one or more non-transitory computer-readable storage media, storing computer-readable instructions that, when executed by the one or more processors, cause the computer device to perform the aforementioned image rendering method.

Details of one or more embodiments of this application are provided in accompanying drawings and description below. Other features, objectives, and advantages of this application will become apparent from the specification, the accompanying drawings, and the claims.

To describe technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer and more understandable, this application is further described in detail below with reference to the accompanying drawings and embodiments. It is to be understood that the specific embodiments described herein are only used for explaining this application, and are not used for limiting this application.

Figure 1:
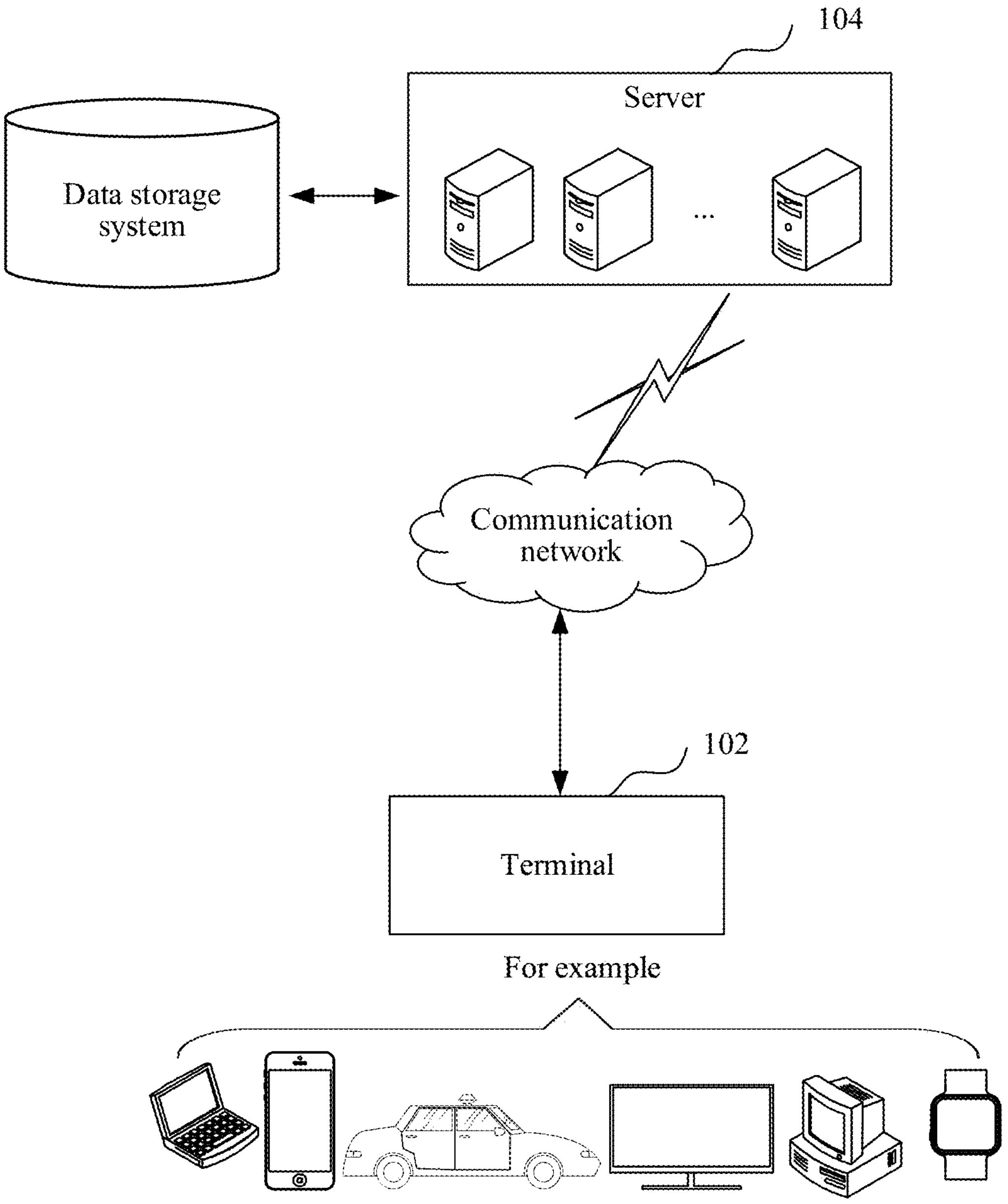
FIG. 1 is a diagram of an application environment of an image rendering method according to an embodiment.

An image rendering method provided in this application may be applied to an application environment shown in FIG. 1. A terminal 102 communicates with a server 104 through a network. A data storage system may store data that the server 104 needs to process. The data storage system may be integrated on the server 104, or may also be placed on a cloud or another server. The terminal 102 may be, but not limited to, a desktop computer, a notebook computer, a smartphone, a tablet computer, an Internet of Things device, or a portable wearable device. The Internet of Things device may be a smart speaker, a smart television, a smart air conditioner, a smart in-vehicle device, or the like. The portable wearable device may be a smart watch, a smart band, a head-mounted device, or the like. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

The terminal 102 may flatten an original object mesh model to obtain a flat mesh model, the original object mesh model being an original three-dimensional mesh model of a target virtual object. The terminal 102 may generate a patch model according to a bounding box patch of the flat mesh model, and perform topological reconstruction on the patch model, to obtain a reconstructed mesh model, a quantity of surfaces of the reconstructed mesh model being less than a quantity of surfaces of the original object mesh model. The terminal 102 may obtain a three-dimensional reconstructed mesh model based on the reconstructed mesh model, the three-dimensional reconstructed mesh model being configured to render the target virtual object.

It may be understood that, the terminal 102 may directly render the target virtual object based on the three-dimensional reconstructed mesh model. The terminal 102 may alternatively send the obtained three-dimensional reconstructed mesh model to the server 104 for storage. This is not limited in this embodiment. It may be understood that, an application scene in FIG. 1 is only an example for description, and is not limited thereto.

Figure 2:
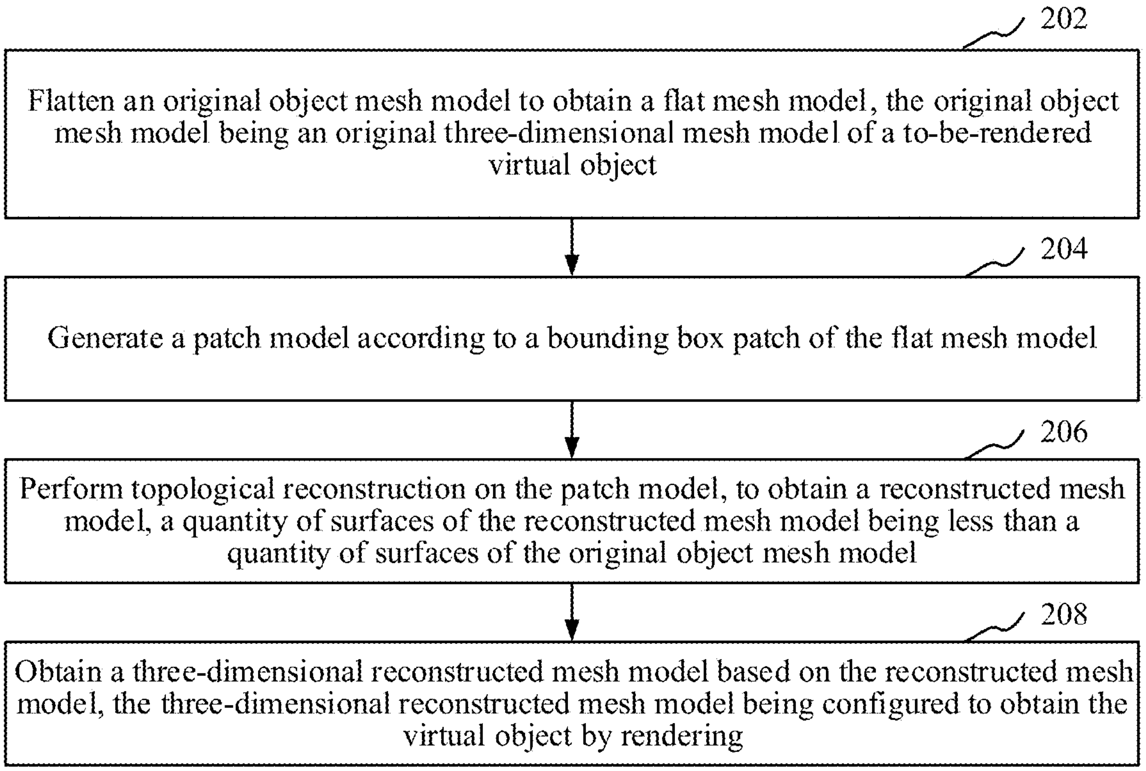
FIG. 2 is a schematic flowchart of an image rendering method according to an embodiment.

In an embodiment, as shown in FIG. 2, an image rendering method is provided. An example in which the method is applied to the terminal 102 in FIG. 1 is used for description in this embodiment, and the following steps are included.

Step 202: Flatten an original object mesh model to obtain a flat mesh model, the original object mesh model being an original three-dimensional mesh model of a target virtual object.

The virtual object is a virtual entity object. The flat mesh model is a two-dimensional mesh model obtained after the original object mesh model is flattened.

Specifically, the terminal may obtain the original object mesh model, and perform coordinate transformation on the original object mesh model, to flatten the original object mesh model, to obtain the flat mesh model.

In an example, the virtual object includes at least one of a virtual plant, a virtual animal, a virtual character, a virtual thing, and the like.

In an embodiment, the terminal may obtain model map coordinate information of the original object mesh model, and perform coordinate transformation on the original object mesh model according to the model map coordinate information, to flatten the original object mesh model, to obtain the flat mesh model. Map coordinate information is two-dimensional coordinate information configured for recording a two-dimensional space corresponding to a three-dimensional virtual object, and is configured for assigning a map to the three-dimensional virtual object. The model map coordinate information is map coordinate information of the original object mesh model.

Step 204: Generate a patch model according to a bounding box patch of the flat mesh model.

A bounding box of the flat mesh model is a geometry configured to bound the flat mesh model. The bounding box patch of the flat mesh model is a bounding surface that is in the bounding box of the flat mesh model and is located on a same plane as the flat mesh model. It may be understood that the bounding box of the flat mesh model includes a plurality of bounding surfaces, from which the bounding surface that is located on the same plane as the flat mesh model may be selected as the bounding box patch of the flat mesh model. The patch model is a two-dimensional model generated after the flat mesh model is processed based on the bounding box patch.

The bounding box of the flat mesh model is a bounding box corresponding to the model map coordinate information of the original object mesh model.

Specifically, the terminal may determine the bounding box of the flat mesh model, and determine the bounding box patch of the flat mesh model according to the bounding box of the flat mesh model. Further, the terminal may generate the patch model according to the bounding box patch of the flat mesh model.

In an embodiment, the terminal may directly assign a map attribute to the bounding box patch of the flat mesh model, to obtain the patch model. The map attribute is an attribute of map coordinate information assigned to the bounding box patch of the flat mesh model.

Step 206: Perform topological reconstruction on the patch model, to obtain a reconstructed mesh model, a quantity of surfaces of the reconstructed mesh model being less than a quantity of surfaces of the original object mesh model.

A quantity of surfaces is a quantity of surfaces in a model. It may be understood that, the quantity of surfaces of the reconstructed mesh model is a quantity of surfaces in the reconstructed mesh model, and the quantity of surfaces of the original object mesh model is a quantity of surfaces in the original object mesh model. It may be understood that, a surface corresponds to a mesh. A mesh is a most basic unit of a mesh model, and is a plane geometric figure, such as a triangle or a quadrilateral. Therefore, the quantity of surfaces of the reconstructed mesh model is also equivalent to a quantity of meshes in the reconstructed mesh model, and the quantity of surfaces of the original object mesh model is also equivalent to a quantity of meshes in the original object mesh model.

Topological reconstruction is a processing operation that an outline of a shaped object may remain unchanged after the shaped object is transformed. It may be understood that, performing topological reconstruction on the patch model may change a model structure of the patch model while keeping an outline of the patch model unchanged, to reduce a quantity of surfaces of the patch model.

Specifically, compared with the quantity of surfaces of the original object mesh model, the quantity of surfaces corresponding to the patch model is not reduced. Therefore, to reduce a rendering resource occupied by the virtual object during rendering, the terminal may perform topological reconstruction on the patch model, to obtain the reconstructed mesh model with less quantity of surfaces than the original object mesh model. It may be understood that, because the patch model is generated and obtained according to the bounding box patch of the flat mesh model, details of the original object mesh model may be retained as much as possible in the reconstructed mesh model while the quantity of surfaces is reduced.

In an embodiment, the terminal may perform topological division again on an internal surface in the patch model, to obtain the reconstructed mesh model. The internal surface in the patch model is a surface inside the patch model, namely, a mesh inside the patch model.

Step 208: Obtain a three-dimensional reconstructed mesh model based on the reconstructed mesh mode, the three-dimensional reconstructed mesh model being configured to render the target virtual object.

The three-dimensional reconstructed mesh model is a reconstructed three-dimensional mesh model.

Specifically, the terminal may perform coordinate transformation on the reconstructed mesh model, to obtain the three-dimensional reconstructed mesh model. The terminal may render the three-dimensional reconstructed mesh model, to obtain the virtual object.

In an embodiment, the terminal may determine a transformation parameter according to the original object mesh model and the flat mesh model, and perform coordinate transformation on the reconstructed mesh model according to the transformation parameter, to obtain the three-dimensional reconstructed mesh model.

In an embodiment, the terminal may determine a transformation parameter according to the original object mesh model and the flat mesh model. Further, the terminal may determine an original model location of the original object mesh model in a world coordinate space, and may transform the reconstructed mesh model to the original model location according to the transformation parameter, to obtain the three-dimensional reconstructed mesh model located at the original model location.

In the foregoing image rendering method, the flat mesh model is obtained after the original object mesh model is flattened. The patch model may be generated according to the bounding box patch of the flat mesh model. A value range of rendering information corresponding to the patch model includes a value range of rendering information corresponding to the original object mesh model. By performing topological reconstruction on the patch model, the reconstructed mesh model may be obtained. Based on the reconstructed mesh model, the three-dimensional reconstructed mesh model with less quantity of surfaces than the original object mesh model may be obtained, so that the virtual object may be obtained by rendering according to the three-dimensional reconstructed mesh model. Because the three-dimensional reconstructed mesh model is obtained through topological reconstruction according to the foregoing patch model, a value range of rendering information corresponding to the three-dimensional reconstructed mesh model also includes the value range of the rendering information corresponding to the original object mesh model. In this way, because the quantity of surfaces of the reconstructed mesh model is less than the quantity of surfaces of the original object mesh model, and compared with the original object mesh model, the rendering information of the three-dimensional reconstructed mesh model is not reduced, a model detail can be retained during surface reduction. Therefore, compared with a conventional manner of directly performing surface reduction on a model, in the image rendering method of this application, a detail of the model can be retained to a maximum extent while reconstruction and surface reduction are performed on the model to reduce a rendering resource, so that a more vivid and realistic virtual object is obtained by rendering, thereby improving image rendering effect.

In an embodiment, the flattening an original object mesh model to obtain a flat mesh model includes: transforming the original object mesh model located at an original model location in a world coordinate space to a model processing plane of the world coordinate space, to obtain a flattened flat mesh model located on the model processing plane. The obtaining a three-dimensional reconstructed mesh model based on the reconstructed mesh model includes: transforming the reconstructed mesh model to the original model location, to obtain the three-dimensional reconstructed mesh model located at the original model location.

The original model location is an original location at which the original object mesh model is located in the world coordinate space. The model processing plane is a plane on which a first quadrant of the world coordinate space is located.

Specifically, the terminal may obtain the original object mesh model located at the original model location in the world coordinate space, and perform coordinate transformation on the original object mesh model, to transform the original object mesh model located at the original model location to the model processing plane of the world coordinate space, to obtain the flattened flat mesh model located on the model processing plane. The terminal may determine the bounding box of the flat mesh model, and determine the bounding box patch of the flat mesh model according to the bounding box of the flat mesh model. Further, the terminal may generate the patch model according to the bounding box patch of the flat mesh model. The terminal may perform topological reconstruction on the patch model, to obtain the reconstructed mesh model that includes less quantity of surfaces than the original object mesh model and is located on the model processing plane. Further, the terminal may transform the reconstructed mesh model located on the model processing plane to the original model location, to obtain the three-dimensional reconstructed mesh model located at the original model location. The terminal may render the three-dimensional reconstructed mesh model located at the original model location, to obtain the virtual object.

In the foregoing embodiment, by flattening the original object mesh model located at the original model location in the world coordinate space, and performing coordinate transformation in the world coordinate space, to transform the original object mesh model located at the original model location to the model processing plane of the world coordinate space, the three-dimensional original object mesh model may be reduced to a two-dimensional plane for model processing, improving efficiency of model processing.

In an embodiment, the transforming the original object mesh model located at an original model location in a world coordinate space to a model processing plane of the world coordinate space, to obtain a flattened flat mesh model located on the model processing plane includes: flattening the original object mesh model according to model map coordinate information of the original object mesh model located at the original model location in the world coordinate space, to obtain an initial flattened mesh model; and transforming the initial flattened mesh model to the model processing plane of the world coordinate space, to obtain the flattened flat mesh model located on the model processing plane.

The initial flattened mesh model is a mesh model obtained after the original object mesh model is flattened.

Specifically, the terminal may obtain the model map coordinate information of the original object mesh model located at the original model location in the world coordinate space. Because the model map coordinate information is two-dimensional coordinate information configured for recording a two-dimensional space corresponding to a three-dimensional virtual object, the terminal may flatten the original object mesh model according to the model map coordinate information of the original object mesh model located at the original model location, to obtain the initial flattened mesh model located at the original model location. The terminal may transform the initial flattened mesh model located at the original model location to the first quadrant of the model processing plane, to obtain the flattened flat mesh model located in the first quadrant of the model processing plane of the world coordinate space.

Figure 3:
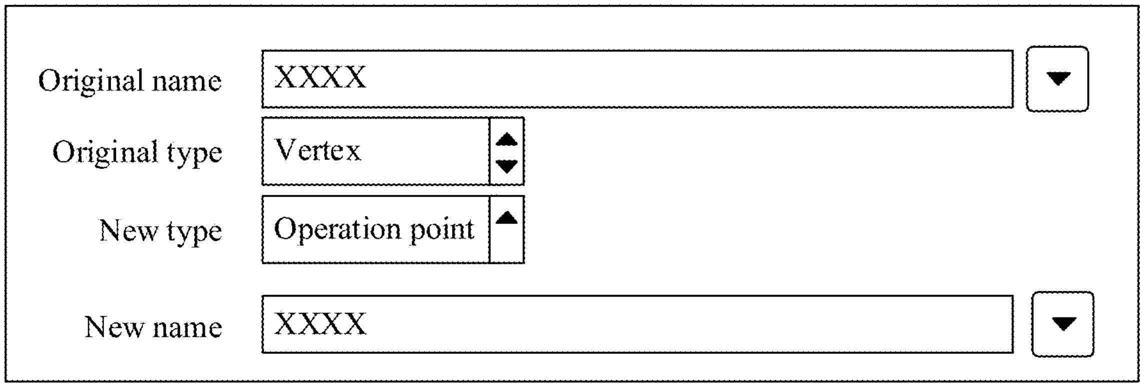
FIG. 3 is a schematic diagram of an interface of transforming a vertex of an initial flattened mesh model into an operation point according to an embodiment.

In an embodiment, because an operation for a model is implemented for an operation point in the model, it may be understood that, a plurality of vertices on the model may correspond to one operation point. Therefore, as shown in FIG. 3, a vertex corresponding to the model map coordinate information in the initial flattened mesh model may be transformed into a point (namely, an operation point), for case of subsequent operation on the initial flattened mesh model.

Figure 4:
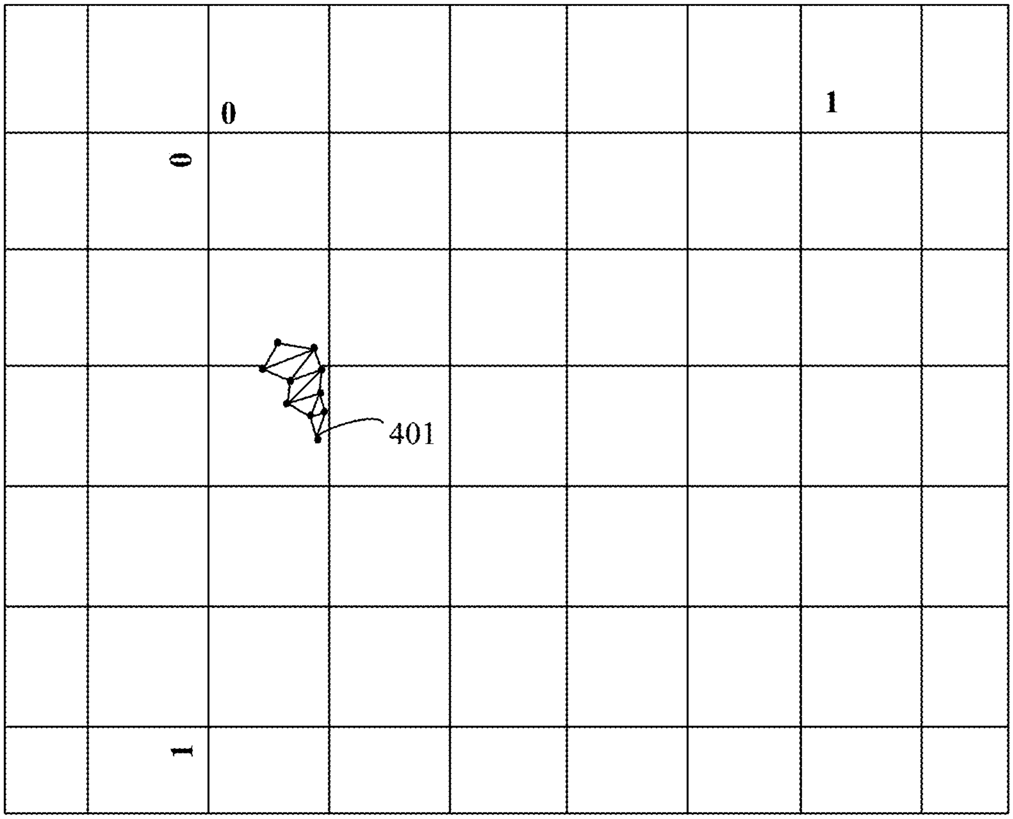
FIG. 4 is a schematic diagram of a flattened flat mesh model located on a model processing plane according to an embodiment.

In an embodiment, the terminal may flatten the original object mesh model according to model map coordinate information of the original object mesh model located at the original model location, to obtain an initial flattened mesh model. Further, as shown in FIG. 4, the terminal may transform the initial flattened mesh model to the model processing plane, to obtain a flattened flat mesh model 401 located on the model processing plane. It may be understood that, because the original object mesh model is flattened according to the model map coordinate information of the original object mesh model, the flattened flat mesh model 401 may just be located in a 0-1 space of the first quadrant of the model processing plane.

In the foregoing embodiment, through the model map coordinate information of the original object mesh model, the original object mesh model may be quickly and accurately flattened, to obtain the initial flattened mesh model. Further, by transforming the initial flattened mesh model to the model processing plane, the flattened flat mesh model located on the model processing plane may be quickly and accurately obtained.

In an embodiment, the method further includes: determining a bounding box of the flat mesh model, where the bounding box includes a plurality of bounding surfaces; and determining a target bounding surface from the plurality of bounding surfaces according to areas respectively corresponding to the plurality of bounding surfaces, and using the target bounding surface as the bounding box patch of the flat mesh model.

Specifically, the terminal may determine the bounding box of the flat mesh model, and the bounding box of the flat mesh model includes the plurality of bounding surfaces. The terminal may determine the target bounding surface from the plurality of bounding surfaces of the flat mesh model according to the areas respectively corresponding to the plurality of bounding surfaces of the flat mesh model, and use the target bounding surface as the bounding box patch of the flat mesh model.

In an embodiment, the terminal may select a bounding surface with a largest area from the plurality of bounding surfaces of the flat mesh model as the target bounding surface, and use the selected target bounding surface as the bounding box patch of the flat mesh model.

Figure 5:
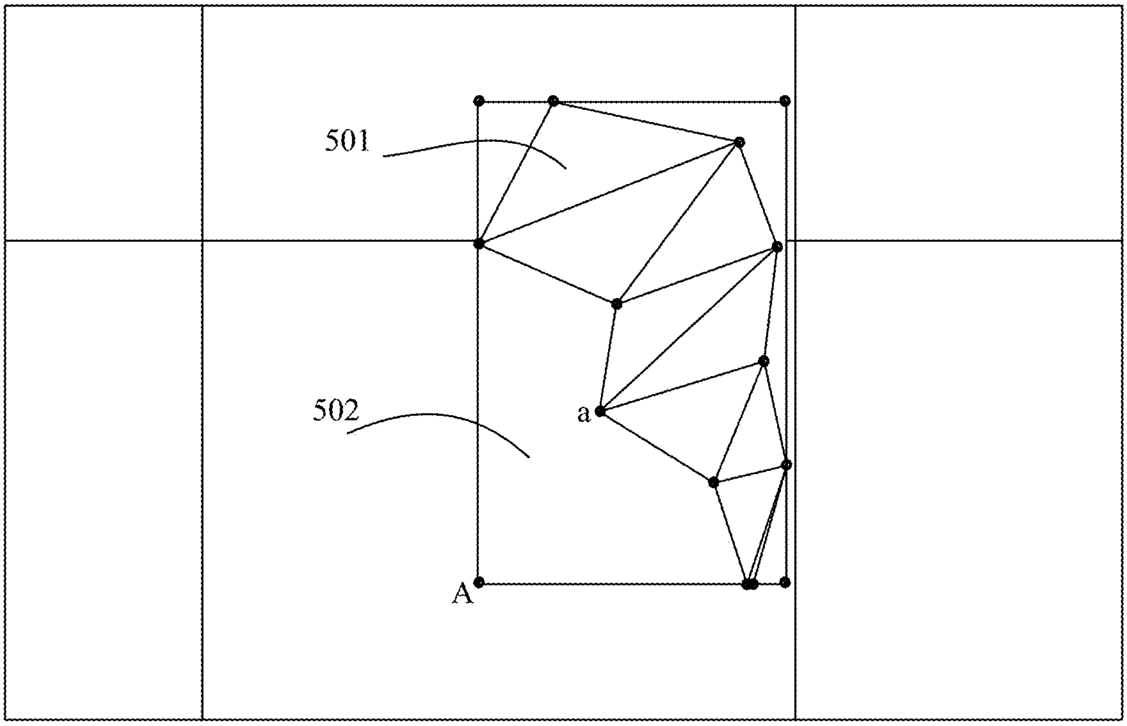
FIG. 5 is a schematic diagram of a bounding box patch of a flat mesh model according to an embodiment.

For example, as shown in FIG. 5, if a bounding box of a flat mesh model 501 is a cubic bounding box, the bounding box of the flat mesh model 501 includes six bounding surfaces. Because the flat mesh model 501 is a two-dimensional model flattened to the model processing plane, in the six bounding surfaces of the cubic bounding box, areas of four bounding surfaces are zero and two bounding surfaces are overlapped. It may be understood that, the overlapped bounding surface is a bounding surface with a largest area in the six bounding surfaces. The terminal may use the bounding surface with the largest area in the six bounding surfaces of the cubic bounding box as a bounding box patch 502 of the flat mesh model 501.

In the foregoing embodiment, by determining the target bounding surface from the plurality of bounding surfaces of the bounding box of the flat mesh model, and using the target bounding surface as the bounding box patch of the flat mesh model, the bounding box patch may match the flat mesh model more closely, thereby further improving rendering effect of the virtual object.

In an embodiment, the generating a patch model according to a bounding box patch of the flat mesh model includes: attaching a point on the bounding box patch of the flat mesh model to the flat mesh model, to obtain an initial patch model, where a value range of model map coordinate information of the initial patch model includes a value range of model map coordinate information of the flat mesh model; and assigning a map attribute to the initial patch model, to obtain the patch model.

The initial patch model is a patch model obtained by attaching the point on the bounding box patch of the flat mesh model to the flat mesh model, and the map attribute is not assigned to the patch model. Attaching is merging a first vertex on the bounding box patch with a corresponding second vertex on the flat mesh model into a single point. The first vertex is a vertex on the bounding box patch. The second vertex is a vertex in the flat mesh model. The second vertex corresponding to the first vertex is a second vertex that is in the flat mesh model and is closest to the first vertex. It may be understood that, attaching is equivalent to a process of merging two points into one point.

Figure 8:
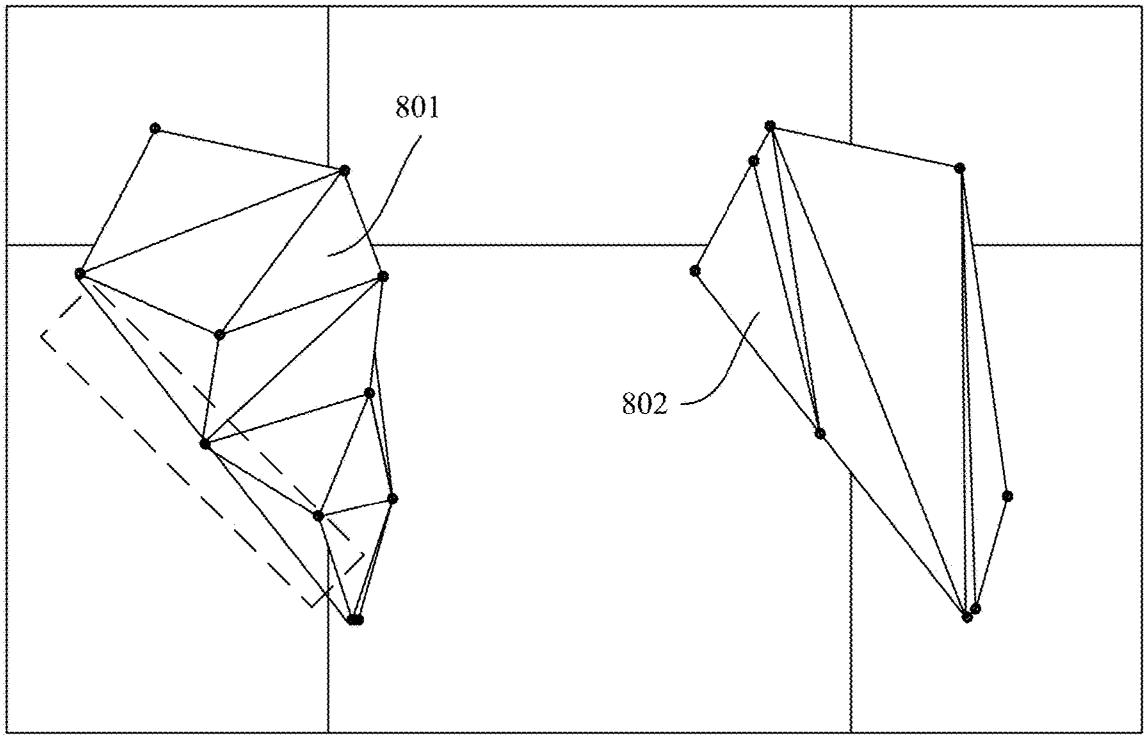
FIG. 8 is a schematic comparative diagram of a patch model and a reconstructed mesh model according to an embodiment.

For case of understanding, attaching processing is exemplarily described with reference to FIG. 5 and FIG. 8. Refer to FIG. 8. 801 is a patch model generated after a first vertex on the bounding box patch 502 is merged with a corresponding second vertex on the flat mesh model 501 in FIG. 5. Currently, a vertex A on the bounding box patch 502 is used as an example. If a vertex on the flat mesh model 501 that is closest to the vertex A is a vertex a, and the vertex A is merged with the vertex a, in other words, attaching processing is performed, an edge indicated by a dotted box in the patch model 801 can be formed. By analogy, the patch model 801 can be obtained by performing the attaching processing on each vertex on the bounding box patch 502.

Specifically, the terminal may attach the point on the bounding box patch of the flat mesh model to the flat mesh model, to obtain the initial patch model. It may be understood that, the bounding box patch of the flat mesh model may be determined by a plurality of line segments, and the terminal may attach a point that is on the plurality of line segments forming the bounding box patch and that is closest to the flat mesh model to a corresponding vertex on the flat mesh model, to obtain the initial patch model. Further, the terminal may assign the map attribute to the initial patch model, to obtain the patch model.

Figure 6:
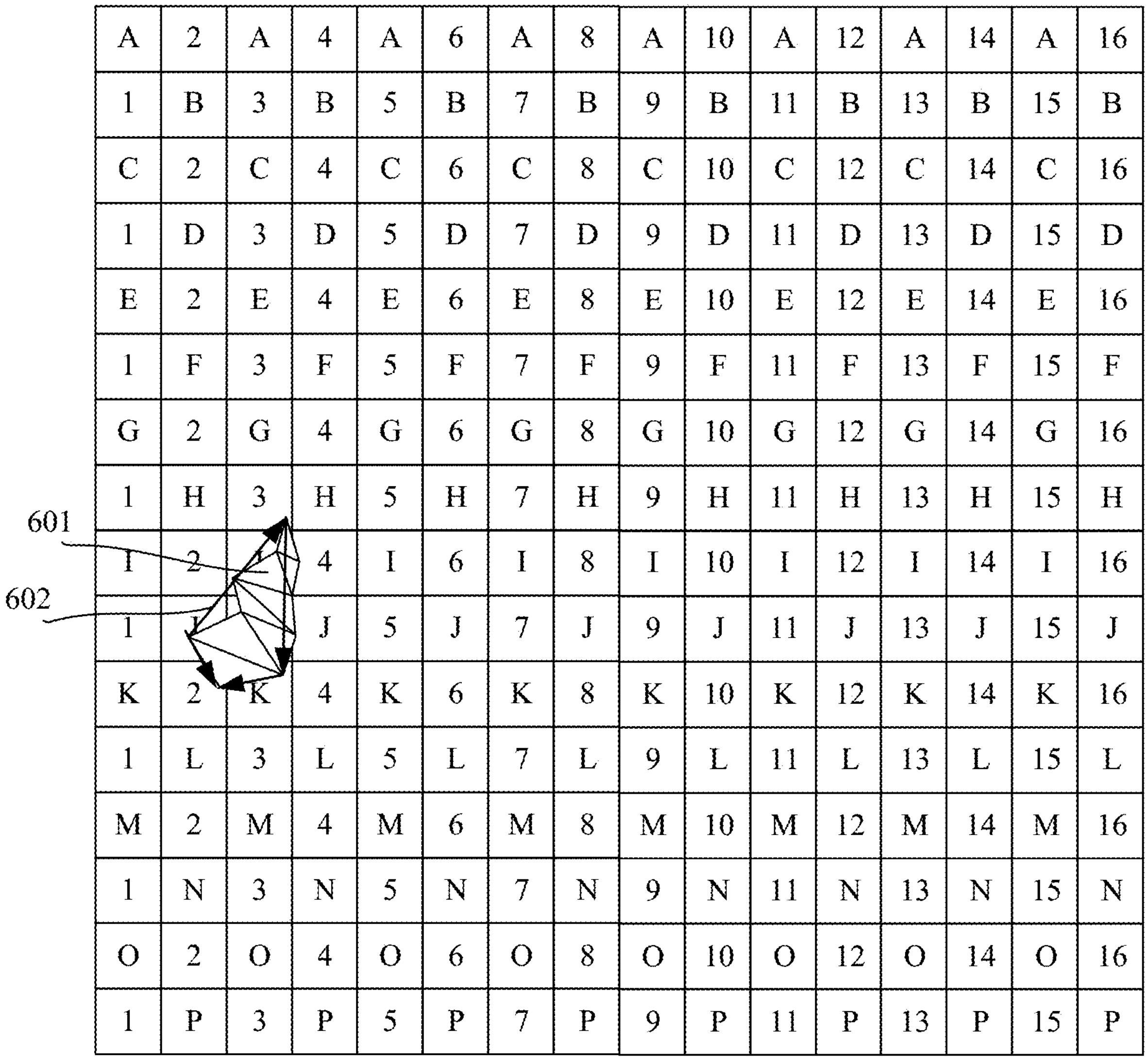
FIG. 6 is a schematic diagram of a patch model according to an embodiment.

In an embodiment, as shown in FIG. 6, a bounding box of a flat mesh model 601 may include a convex bounding box. The terminal may determine a bounding box patch of the flat mesh model 601 from each bounding surface of the convex bounding box of the flat mesh model 601. The terminal may attach a point on the bounding box patch of the flat mesh model 601 to the flat mesh model, to obtain an initial patch model located on the model processing plane, and assign the map attribute to the initial patch model located on the model processing plane, to obtain a patch model 602 located on the model processing plane. Numbers and letters of grids in FIG. 6 are configured for representing locations of the flat mesh model 601 and the patch model 602 for the flat mesh model 601 on the model processing plane.

Figure 7:
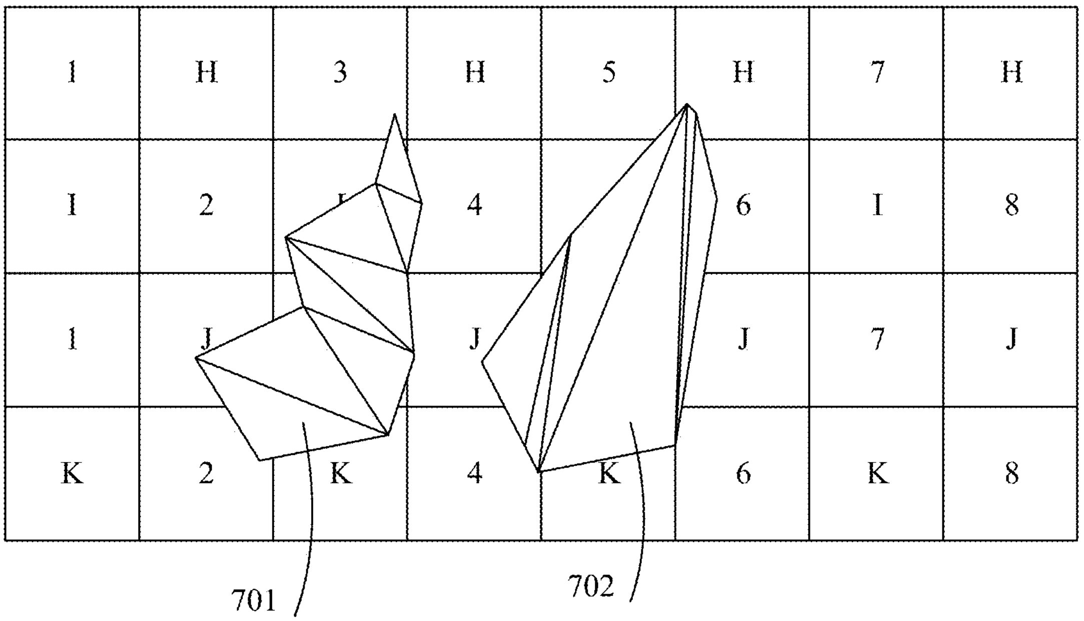
FIG. 7 is a schematic comparative diagram of a flat mesh model and an initial patch model according to an embodiment.

In an embodiment, it may be learned from FIG. 7 that, a value range of model map coordinate information of an initial patch model 702 includes a value range of model map coordinate information of a flat mesh model 701. A location of the initial patch model 702 is actually at the flat mesh model 701, and for case of comparison, the initial patch model 702 is moved to a side of the flat mesh model 701.

In the foregoing embodiment, by attaching the point on the bounding box patch of the flat mesh model to the flat mesh model, the initial patch model that matches the flat mesh model more closely may be obtained, thereby further improving rendering effect of the virtual object. By assigning the map attribute to the initial patch model, the patch model may be quickly obtained, thereby improving generation efficiency of the patch model.

In an embodiment, the performing topological reconstruction on the patch model, to obtain a reconstructed mesh model includes: deleting an internal surface of the patch model; and performing, according to vertices on the patch model with the internal surface deleted, internal surface re-division on the patch model with the internal surface deleted, to obtain the reconstructed mesh model.

The internal surface of the patch model is a mesh inside the patch model. It may be understood that, deleting the internal surface of the patch model is deleting a vertex and an edge that are in the patch model and do not affect an outline of the patch model, and only retaining a vertex of a mesh that affects the outline of the patch model. It may be understood that, deleting a part of vertices and edges may cause deletion of the mesh inside the patch model, to achieve an objective of deleting the internal surface of the patch model.

Specifically, the patch model is a two-dimensional model. Therefore, the terminal may delete the internal surface of the patch model, and perform, according to vertices on the patch model with the internal surface deleted, internal surface re-division on the patch model with the internal surface deleted, to obtain the reconstructed mesh model with at least one internal surface.

In an embodiment, as shown in FIG. 8, the terminal may delete an internal surface of a patch model 801, and perform, according to vertices on the patch model with the internal surface deleted, internal surface re-division on the patch model with the internal surface deleted, to obtain a reconstructed mesh model 802 located on the model processing plane. It may be learned from FIG. 8 that, a quantity of surfaces of the reconstructed mesh model 802 is less than a quantity of surfaces of the patch model 801.

In the foregoing embodiment, by deleting the internal surface of the patch model, and performing, according to vertices on the patch model with the internal surface deleted, internal surface re-division on the patch model with the internal surface deleted, to reduce the quantity of surfaces of the model while retaining the model detail to a greatest extent, the reconstructed mesh model is obtained, and a subsequent rendering resource for rendering the virtual object is further reduced.

In an embodiment, the transforming the reconstructed mesh model to the original model location, to obtain the three-dimensional reconstructed mesh model located at the original model location includes: determining a transformation matrix according to a location relationship between the original object mesh model and the flat mesh model; and transforming the reconstructed mesh model to the original model location according to the transformation matrix, to obtain the three-dimensional reconstructed mesh model located at the original model location.

The transformation matrix is a matrix configured to perform space transformation on the reconstructed mesh model.

Specifically, because the original model location is also within the model processing plane, the terminal may determine the transformation matrix according to the location relationship between the original object mesh model and the flat mesh model on the model processing plane. Further, the terminal may transform the reconstructed mesh model to the original model location according to the transformation matrix, to obtain the three-dimensional reconstructed mesh model located at the original model location.

Figure 9:
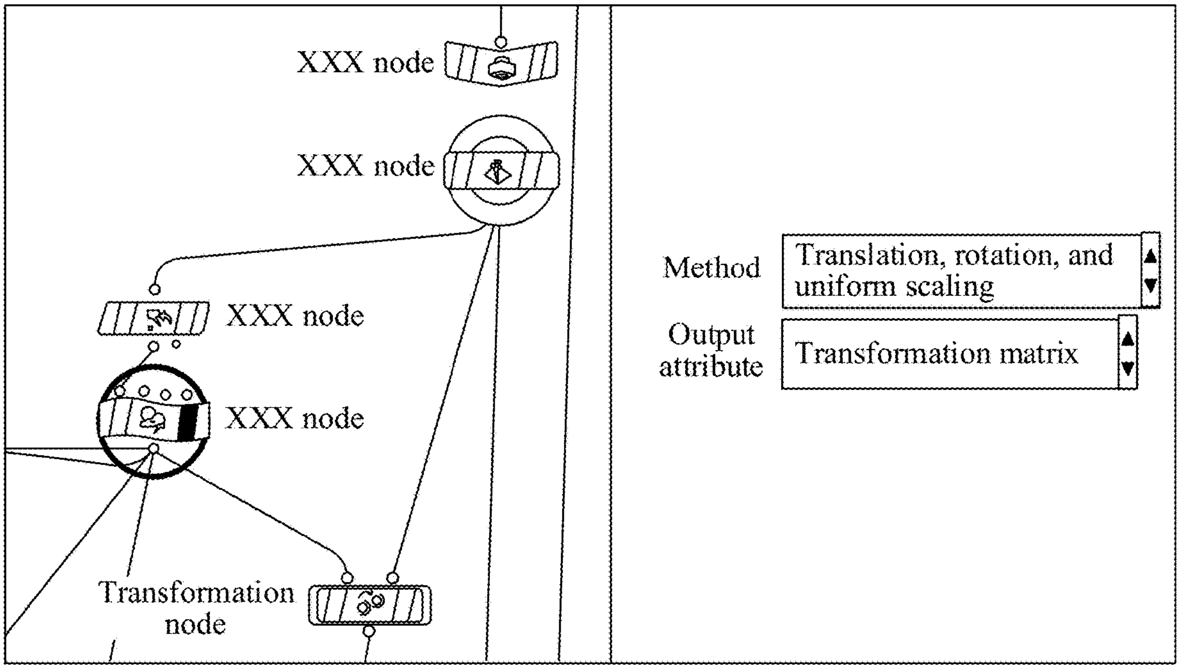
FIG. 9 is a schematic diagram of an interface for obtaining a transformation matrix according to an embodiment.

In an embodiment, model processing software is deployed in the terminal, the model processing software includes a plurality of nodes, and each node may perform corresponding processing on the model. As shown in FIG. 9, the terminal may perform processing by using a transformation node in the model processing software, and the transformation node includes methods such as translation, rotation, and uniform scaling. Based on the methods in the transformation node, the terminal may output the transformation matrix according to the location relationship between the original object mesh model and the flat mesh model. Further, the terminal may transform the reconstructed mesh model to the original model location according to the transformation matrix, to obtain the three-dimensional reconstructed mesh model located at the original model location.

Figure 10:
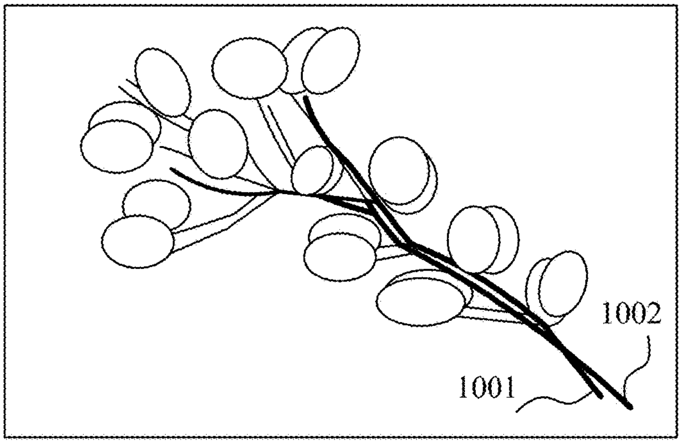
FIG. 10 is a schematic diagram of location offsets of a three-dimensional reconstructed mesh model and an original object mesh model according to an embodiment.

In an embodiment, as shown in FIG. 10, actually there is a specified offset between a virtual object 1002 obtained through rendering according to the three-dimensional reconstructed mesh model and a virtual object 1001 obtained through rendering according to the original object mesh model. However, an error of the offset is small and may be ignored.

In the foregoing embodiment, the transformation matrix may be accurately determined according to the location relationship between the original object mesh model and the flat mesh model, so that the reconstructed mesh model may be transformed to the original model location according to the transformation matrix more accurately, to obtain the three-dimensional reconstructed mesh model located at the original model location, which reduces a location offset caused by model transformation and improves subsequent rendering effect of the virtual object.

In an embodiment, the image rendering method further includes: performing surface reduction on the three-dimensional reconstructed mesh model, to obtain a surface-reduced mesh model, where a quantity of surfaces of the surface-reduced mesh model is less than a quantity of surfaces of the three-dimensional reconstructed mesh model; and the surface-reduced mesh model is configured to render the target virtual object.

The surface-reduced mesh model is a mesh model obtained after surface reduction is performed on the three-dimensional reconstructed mesh model. It may be understood that, the three-dimensional reconstructed mesh model includes a plurality of meshes. A mesh is a most basic unit of the mesh model, and is a plane geometric figure, such as a triangle or a quadrilateral. A mesh is equivalent to a surface. Surface reduction is processing of reducing a quantity of meshes in the mesh model.

Specifically, to further reduce the quantity of surfaces of the three-dimensional reconstructed mesh model, the terminal may perform surface reduction on the three-dimensional reconstructed mesh model, to obtain the surface-reduced mesh model. The terminal may render the surface-reduced mesh model, to obtain the virtual object.

In an embodiment, the terminal may use the three-dimensional reconstructed mesh model as a new original object mesh model, and perform the operation of flattening an original object mesh model to obtain a flat mesh model and subsequent operations again, that is, perform steps 202 to 208 again, to continue to reduce the quantity of surfaces of the three-dimensional reconstructed mesh model, to obtain the surface-reduced mesh model. Further, the terminal may render the surface-reduced mesh model, to obtain the virtual object. In this way, by continuously performing surface reduction on the obtained three-dimensional reconstructed mesh model in a manner of the three-dimensional reconstructed mesh model, the quantity of surfaces of the model may be further reduced while retaining the model detail of the original object mesh model to a maximum extent, and the rendering resource may be further reduced.

In an embodiment, the terminal may perform direct surface reduction on the three-dimensional reconstructed mesh model, to reduce the quantity of surfaces of the three-dimensional reconstructed mesh model, to obtain the surface-reduced mesh model. Further, the terminal may render the surface-reduced mesh model, to obtain the virtual object. In this way, by performing direct surface reduction on the three-dimensional reconstructed mesh model, the quantity of surfaces of the model may be further reduced while retaining the model detail of the original object mesh model as much as possible, and the rendering resource may be further reduced.

Figure 11:
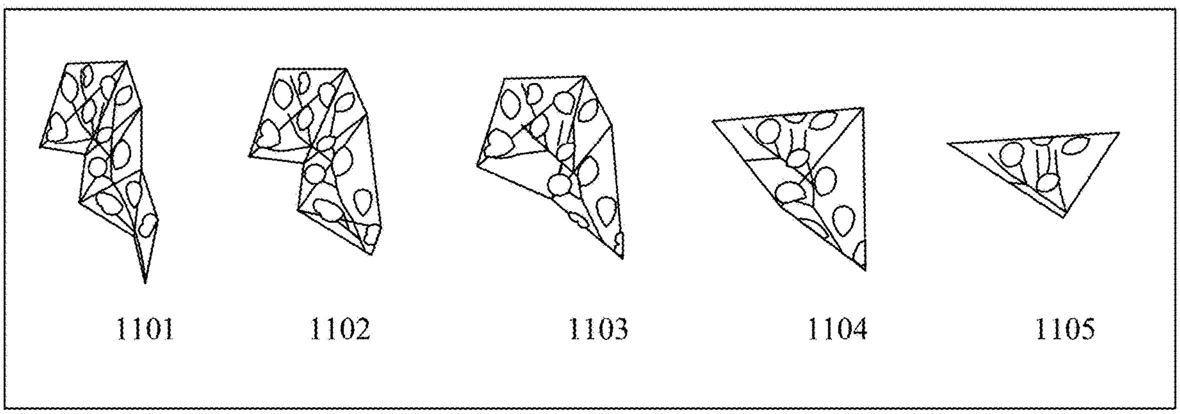
FIG. 11 is an effect diagram of a virtual object rendered in a conventional direct surface reduction manner according to an embodiment.

In an embodiment, as shown in FIG. 11, if direct surface reduction is performed on an original object mesh model 1101 including nine surfaces in a conventional direct surface reduction manner, a mesh model 1102 including six surfaces after surface reduction, a mesh model 1103 including four surfaces after surface reduction, a mesh model 1104 including two surfaces after surface reduction, and a mesh model 1105 including one surface after surface reduction may be obtained respectively. Obviously, if direct surface reduction is performed on the original object mesh model 1101, a lot of model details may be lost. If rendering is performed based on a surface-reduced mesh model, the rendering effect of the virtual object may be poor.

Figure 12:
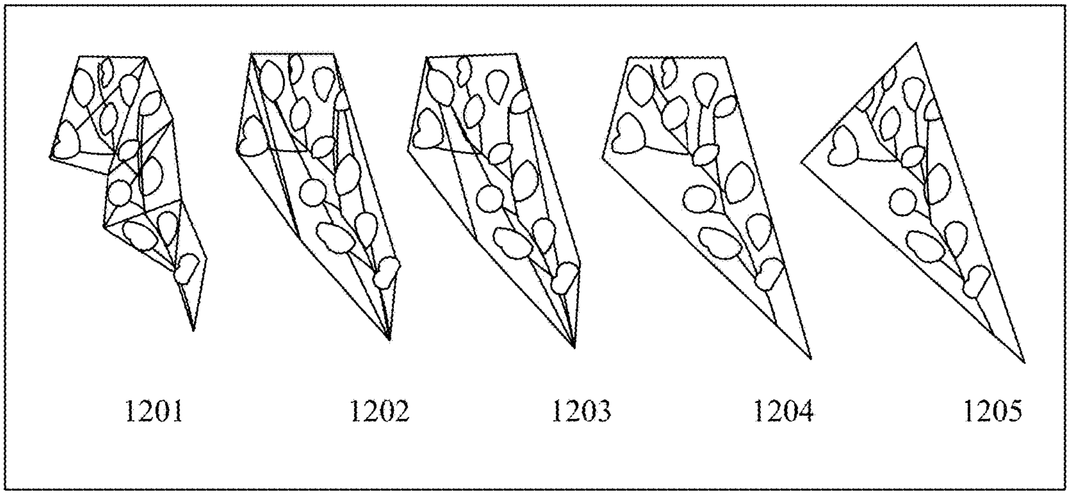
FIG. 12 is an effect diagram of a virtual object rendered in a model-reconstructed surface reduction manner in this application according to an embodiment.

In an embodiment, as shown in FIG. 12, if model reconstruction is performed on an original object mesh model 1201 including nine surfaces in a model-reconstructed surface reduction manner in this application, a three-dimensional reconstructed mesh model 1202 including six surfaces is obtained. If to further reduce the rendering resource, the terminal may perform surface reduction again on the three-dimensional reconstructed mesh model 1202 obtained through reconstruction, a mesh model 1203 including four surfaces, a mesh model 1204 including two surfaces, and a mesh model 1205 including one surface may be obtained respectively. Obviously, if reconstruction and surface reduction are performed on the original object mesh model 1201, the model detail may be retained to a greatest extent and the rendering effect of the virtual object may be improved. In addition, if surface reduction is further performed based on the three-dimensional reconstructed mesh model 1202 obtained through reconstruction, the rendering resource may be further reduced while retaining the model detail to the maximum extent.

Figure 13:
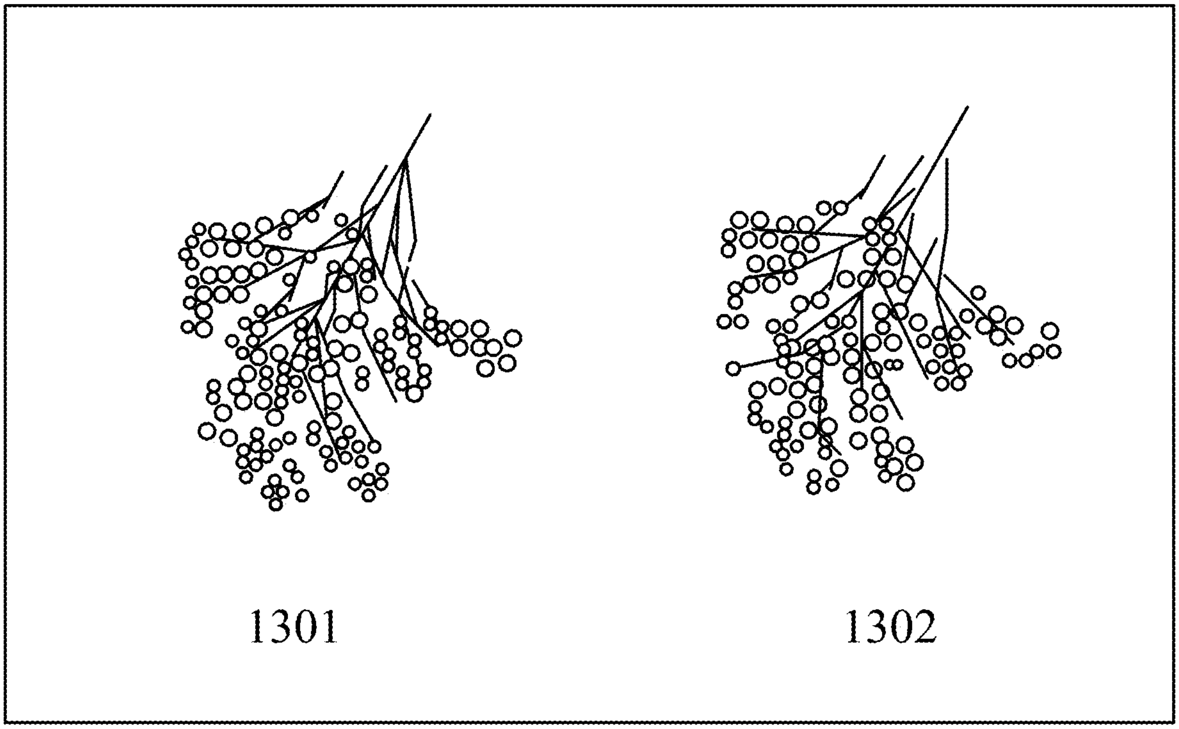
FIG. 13 is an effect diagram of a virtual object rendered in a model-reconstructed surface reduction manner in this application according to another embodiment.

In an embodiment, as shown in FIG. 13, if model reconstruction is performed on an original object mesh model including 790 surfaces in a model-reconstructed surface reduction manner in this application, a three-dimensional reconstructed mesh model including 141 surfaces may be obtained. The terminal performs rendering according to the original object mesh model including 790 surfaces, and may obtain a virtual object 1301. The terminal performs rendering according to the three-dimensional reconstructed mesh model including 141 surfaces, and may obtain a virtual object 1302. Obviously, there is not much difference in appearance between the virtual object 1302 obtained through rendering according to the three-dimensional reconstructed mesh model including a smaller quantity of surfaces and the virtual object 1301 obtained through rendering according to the original object mesh model including a larger quantity of surfaces. In other words, if the method in this application is used, the model detail may be retained to a maximum extent while performing surface reduction, so that the virtual object obtained by rendering is more vivid and realistic.

Figure 14:
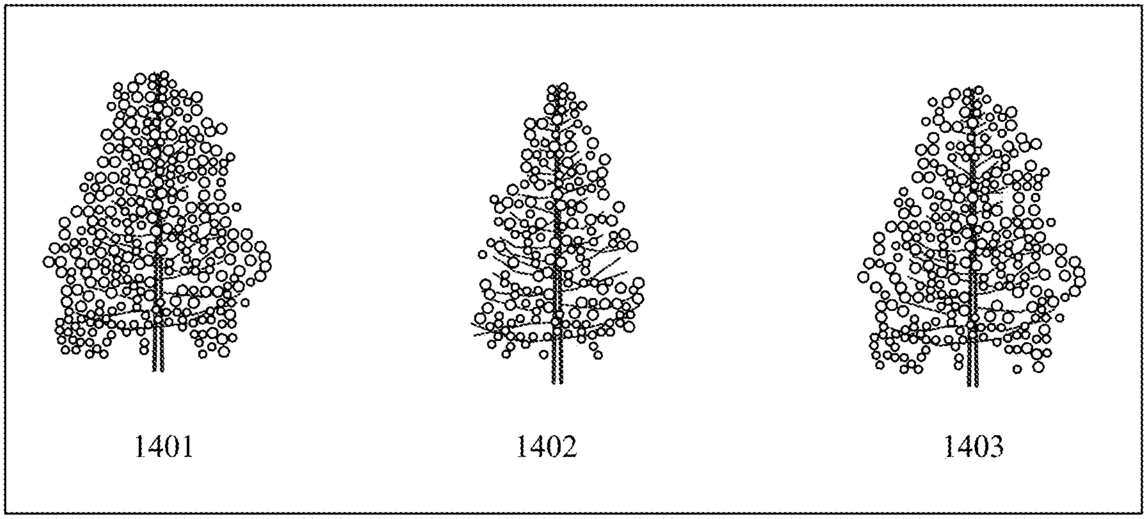
FIG. 14 is an effect diagram of a virtual object rendered in a model-reconstructed surface reduction manner in this application according to still another embodiment.

In an embodiment, as shown in FIG. 14, if direct surface reduction is performed on an original object mesh model including 210,000 surfaces in a conventional direct surface reduction manner, a mesh model including 20,000 surfaces may be obtained. The terminal performs rendering according to the original object mesh model including 210,000 surfaces, and a virtual object 1401 may be obtained. The terminal performs rendering according to the direct surface-reduced mesh model including 20,000 surfaces, and a virtual object 1402 may be obtained. If direct surface reduction is performed on the original object mesh model 1401, a lot of model details may be lost. If rendering is performed based on a surface-reduced mesh model, rendering effect of the virtual object 1402 is poor. However, if model reconstruction is performed on the original object mesh model including 210,000 surfaces in a model-reconstructed surface reduction manner in this application, a three-dimensional reconstructed mesh model including 15,000 surfaces may be obtained. The terminal performs rendering according to the three-dimensional reconstructed mesh model including 15,000 surfaces, and a virtual object 1403 may be obtained. Obviously, compared with the conventional direct surface reduction manner, more model details may be retained in a model-reconstructed surface reduction manner in this application, so that there is not much difference in appearance between the virtual object 1403 obtained through rendering according to the three-dimensional reconstructed mesh model including a smaller quantity of surfaces and the virtual object 1401 obtained through rendering according to the original object mesh model including a larger quantity of surfaces, so that the virtual object obtained by rendering is more vivid and realistic.

Figure 15:
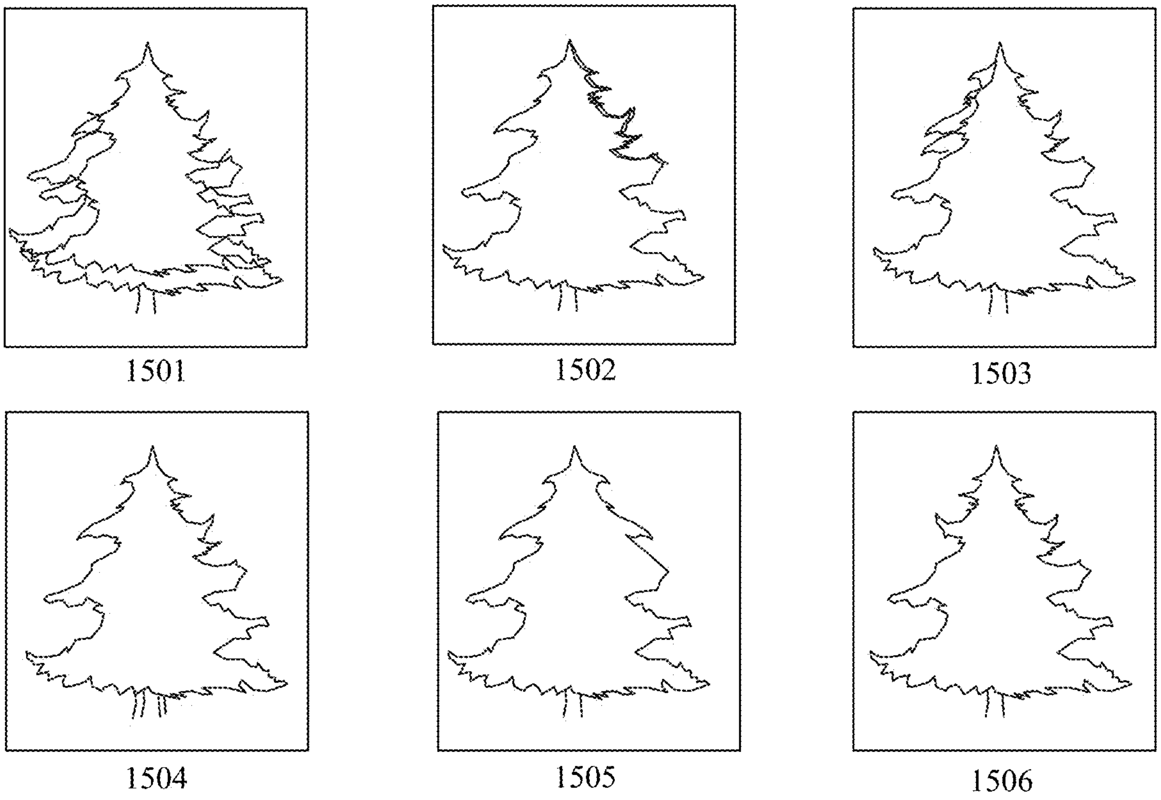
FIG. 15 is an effect diagram of a virtual object rendered in a model-reconstructed surface reduction manner in this application according to still another embodiment.

FIG. 15 are three-dimensional reconstructed mesh models of six levels generated in a model-reconstructed surface reduction manner in this application, namely, a three-dimensional reconstructed mesh model 1501 of a first level, a three-dimensional reconstructed mesh model 1502 of a second level, a three-dimensional reconstructed mesh model 1503 of a third level, a three-dimensional reconstructed mesh model 1504 of a fourth level, a three-dimensional reconstructed mesh model 1505 of a fifth level, and a three-dimensional reconstructed mesh model 1506 of a sixth level. The three-dimensional reconstructed mesh model 1501 of the first level has a largest quantity of surfaces, and the three-dimensional reconstructed mesh model 1506 of the sixth level has a smallest quantity of surfaces. It may be understood that, the terminal may select, according to a distance between a viewpoint for a virtual object and the virtual object, a corresponding three-dimensional reconstructed mesh model from the three-dimensional reconstructed mesh models of six levels to render the target virtual object. It may be understood that, if the distance is short, more details may be retained, and if the distance is long, fewer details may be retained.

Figure 16:
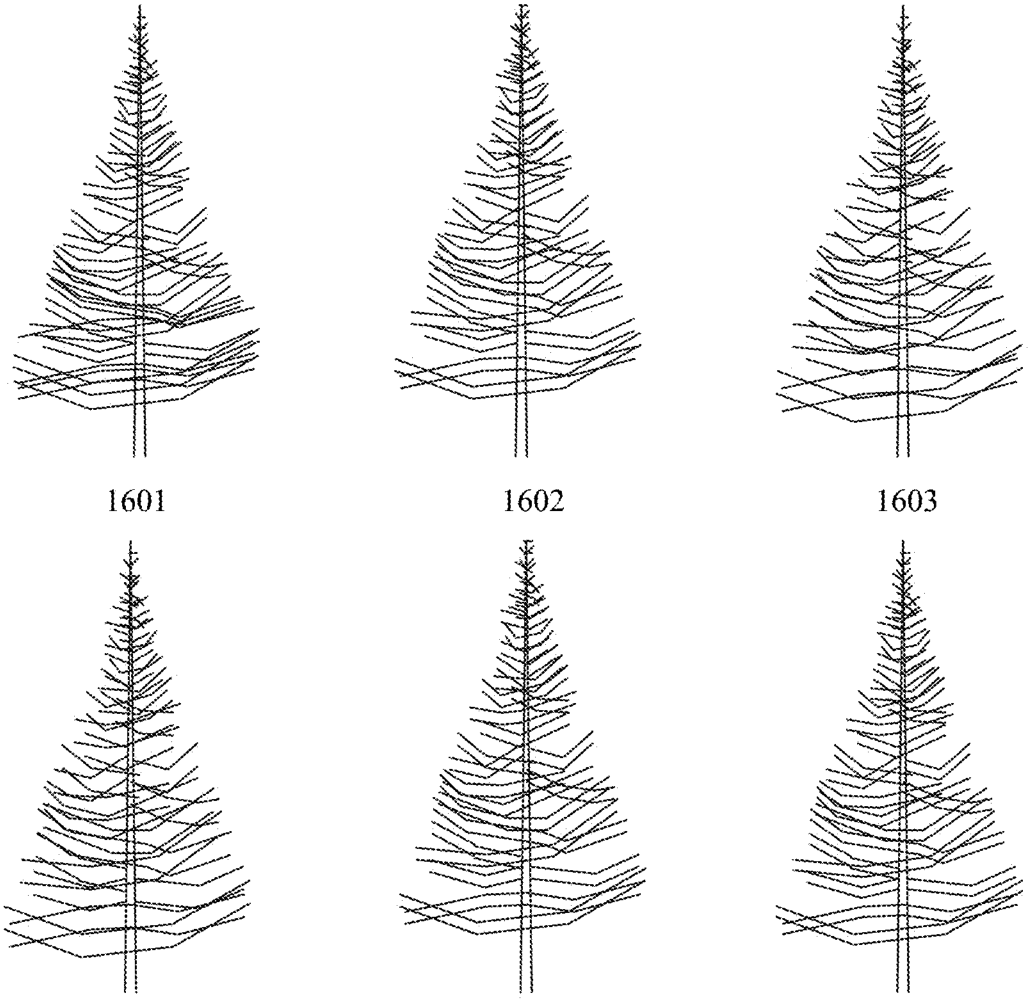
FIG. 16 is an effect diagram of a virtual object rendered in a model-reconstructed surface reduction manner in this application according to still another embodiment.

In an embodiment, as shown in FIG. 16, three-dimensional reconstructed mesh models of six levels, namely, a three-dimensional reconstructed mesh model 1601 of a first level (a quantity of surfaces is 8053), a three-dimensional reconstructed mesh model 1602 of a second level (a quantity of surfaces is 5599), a three-dimensional reconstructed mesh model 1603 of a third level (a quantity of surfaces is 3175), a three-dimensional reconstructed mesh model 1604 of a fourth level (a quantity of surfaces is 2283), a three-dimensional reconstructed mesh model 1605 of a fifth level (a quantity of surfaces is 1650), and a three-dimensional reconstructed mesh model 1606 of a sixth level (a quantity of surfaces is 685) are generated in a model-reconstructed surface reduction manner in this application. It may be understood that, the more quantity of surfaces, the more carriable model details, and the terminal may select, according to a distance between a viewpoint for a virtual object and the virtual object, a corresponding three-dimensional reconstructed mesh model from the three-dimensional reconstructed mesh models of six levels to render the target virtual object. It may be understood that, if the distance is short, more details may be retained, and if the distance is long, fewer details may be retained.

In an embodiment, if the virtual object obtained by rendering according to the three-dimensional reconstructed mesh model is partially cropped, an integrity of the virtual object is not high. In this case, if to completely render the target virtual object, the terminal may expand model map coordinate information of the original object mesh model and perform model reconstruction based on expanded model map coordinate information, a new three-dimensional reconstructed mesh model may be obtained, and a complete virtual object may be obtained by rendering according to the new three-dimensional reconstructed mesh model.

In the foregoing embodiment, by performing surface reduction on the three-dimensional reconstructed mesh model, the surface-reduced mesh model may be directly obtained. Because the quantity of surfaces of the surface-reduced mesh model is less than the quantity of surfaces of the three-dimensional reconstructed mesh model, the rendering resource for rendering the virtual object may be further reduced.

In an embodiment, the image rendering method further includes: rendering the target virtual object according to the three-dimensional reconstructed mesh model when a distance between a viewpoint for the virtual object and the virtual object satisfies a short distance condition. That a distance between a viewpoint for the virtual object and the virtual object satisfies a short distance condition indicates that the distance between the viewpoint for the virtual object and the virtual object is short. In other words, in this case, a distance between a user and the virtual object is short. In this case, rendering the virtual object by using the three-dimensional reconstructed mesh model may make the virtual object obtained by rendering more vivid and realistic, and the user may also see more details of the virtual object.

In an embodiment, the image rendering method further includes: rendering the target virtual object according to an insert model corresponding to the original object mesh model when a distance between a viewpoint for the virtual object and the virtual object satisfies a long distance condition, where a quantity of surfaces of the insert model is less than a quantity of surfaces of the three-dimensional reconstructed mesh model. That a distance between a viewpoint for the virtual object and the virtual object satisfies a long distance condition indicates that the distance between the viewpoint for the virtual object and the virtual object is long.

In other words, in this case, a distance between a user and the virtual object is long. In this case, rendering the target virtual object by using the insert model corresponding to the original object mesh model may improve rendering efficiency of the virtual object.

The short distance condition is a distance condition that the viewpoint for the virtual object is close to the virtual object. The long distance condition is a distance condition that the viewpoint for the virtual object is far away from the virtual object. The insert model corresponding to the original object mesh model is a map model. The insert model corresponding to the original object mesh model includes corresponding maps of the original object mesh model in a plurality of orientations.

Specifically, the terminal may determine the distance between the viewpoint for the virtual object and the virtual object, and the terminal may render the target virtual object according to the three-dimensional reconstructed mesh model when the distance between the viewpoint for the virtual object and the virtual object satisfies the short distance condition. The terminal may obtain the insert model corresponding to the original object mesh model and render the target virtual object according to the insert model corresponding to the original object mesh model when the distance between the viewpoint for the virtual object and the virtual object satisfies the long distance condition.

In an embodiment, the operation of rendering the target virtual object according to an insert model corresponding to the original object mesh model includes: determining that the viewpoint for the virtual object is located at an orientation of the virtual object; and determining, from the insert model corresponding to the original object mesh model, a map corresponding to the orientation, and rendering the target virtual object according to the determined map. It may be understood that, the terminal may determine that the viewpoint for the virtual object is located at the orientation of the virtual object, and perform rendering by using the map of the corresponding orientation in the insert model according to the determined orientation, to obtain the virtual object corresponding to the corresponding orientation. In this way, rendering the virtual object by using the map corresponding to the orientation of the viewpoint in the insert model may improve rendering accuracy of the virtual object.

In an embodiment, the short distance condition includes at least one of that the distance between the viewpoint for the virtual object and the virtual object is less than a first preset distance threshold, and that the distance between the viewpoint for the virtual object and the virtual object is within a preset distance range.

In an embodiment, the long distance condition includes at least one of that the distance between the viewpoint for the virtual object and the virtual object is greater than or equal to a preset distance threshold, and that the distance between the viewpoint for the virtual object and the virtual object is within a second preset distance range. A distance value with the second preset distance range is greater than a distance value within the first preset distance range.

In an embodiment, the terminal may perform surface reduction on the three-dimensional reconstructed mesh model, to obtain a surface-reduced mesh model located at the original model location, where a quantity of surfaces of the surface-reduced mesh model is less than a quantity of surfaces of the three-dimensional reconstructed mesh model. In addition, the terminal may obtain the insert model corresponding to the original object mesh model. The quantity of surfaces of the insert model is less than the quantity of surfaces of the surface-reduced mesh model.

In an embodiment, the terminal may render the target virtual object according to the three-dimensional reconstructed mesh model when the distance between the viewpoint for the virtual object and the virtual object is less than or equal to 5 meters. The terminal may render the target virtual object according to the surface-reduced mesh model when the distance between the viewpoint for the virtual object and the virtual object is greater than 5 meters and less than 10 meters. The terminal may render the target virtual object according to the insert model when the distance between the viewpoint for the virtual object and the virtual object is greater than or equal to 15 meters.

Figure 17:
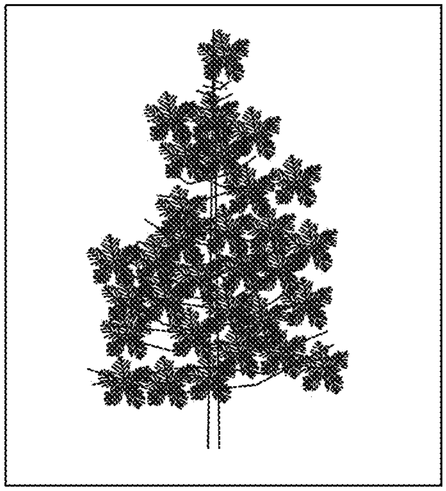
FIG. 17 is a schematic diagram of display effect of a virtual object obtained through rendering according to an insert model according to an embodiment.

In an embodiment, as shown in FIG. 17, the terminal may obtain the virtual object (for example, a virtual tree in FIG. 17) by rendering according to the insert model corresponding to the original object mesh model when the distance between the viewpoint for the virtual object and the virtual object satisfies the long distance condition. Because the quantity of surfaces of the insert model is less than the quantity of surfaces of the three-dimensional reconstructed mesh model, rendering the target virtual object by using the insert model corresponding to the original object mesh model, the rendering resource may be further reduced.

In the foregoing embodiment, the virtual object may be obtained by rendering according to the three-dimensional reconstructed mesh model when the distance between the viewpoint for the virtual object and the virtual object is short. The virtual object is directly obtained by rendering according to the insert model corresponding to the original object mesh model when the distance between the viewpoint for the virtual object and the virtual object is long. In this way, by selecting a different model in a different distance case to render the virtual object, the rendering resource for the virtual object may be reduced to a greatest extent while retaining the model detail to a greatest extent.

In an embodiment, the image rendering method further includes an insert model generation operation. The insert model generation operation includes: obtaining initial orientation patches of the original object mesh model in a plurality of orientations; performing size matching on the initial orientation patches and the original object mesh model, to obtain target orientation patches in the plurality of orientations; and scaling and arranging patch map coordinate information of the target orientation patches, and performing map baking according to scaled and arranged patch map coordinate information, to obtain the insert model corresponding to the original object mesh model, where the scaled and arranged patch map coordinate information of the target orientation patches is independent from each other.

The initial orientation patches are orientation patches respectively corresponding to the original object mesh model on which size matching is not performed in the plurality of orientations. It may be understood that, the initial orientation patch is a result obtained by projecting the original object mesh model onto a plane corresponding to each orientation. The target orientation patches are orientation patches respectively corresponding to the original object mesh model on which size matching is performed in the plurality of orientations. It may be understood that, a size of the target orientation patch obtained after size matching is less than a size of the initial orientation patch. The patch map coordinate information is map coordinate information of the target orientation patch.

Specifically, the original object mesh model may correspond to a different initial orientation patch in a different orientation. The terminal may obtain the initial orientation patches of the original object mesh model in the plurality of orientations, and perform size matching on the initial orientation patches and the original object mesh model, to obtain the target orientation patches in the plurality of orientations. The terminal may obtain the patch map coordinate information of the target orientation patches, and scale and arrange the patch map coordinate information of the target orientation patches. Further, the terminal may perform map baking according to the scaled and arranged patch map coordinate information, to obtain the insert model corresponding to the original object mesh model.

In an embodiment, the terminal may obtain size information for the original object mesh model, and perform size matching on the initial orientation patches and the original object mesh model according to the size information for the original object mesh model, to obtain the target orientation patches in the plurality of orientations.

Figure 18:
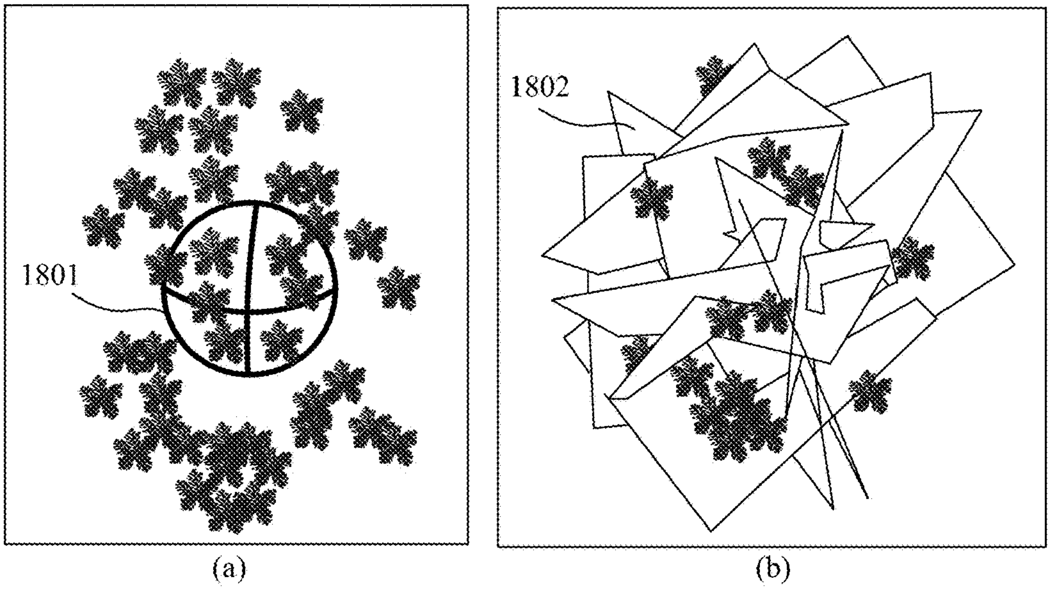
FIG. 18 is a schematic diagram of generating an initial orientation patch according to an embodiment.

In an embodiment, as shown in (a) in FIG. 18, the terminal may place a sphere 1801 in a middle of the original object mesh model, and evenly distribute surface placement points on the sphere 1801. Each surface placement point represents an orientation. As shown in (b) in FIG. 18, the terminal may place surfaces corresponding to the original object mesh model on the surface placement points respectively, to obtain initial orientation patches 1802 of the original object mesh model in the plurality of orientations.

Figure 19:
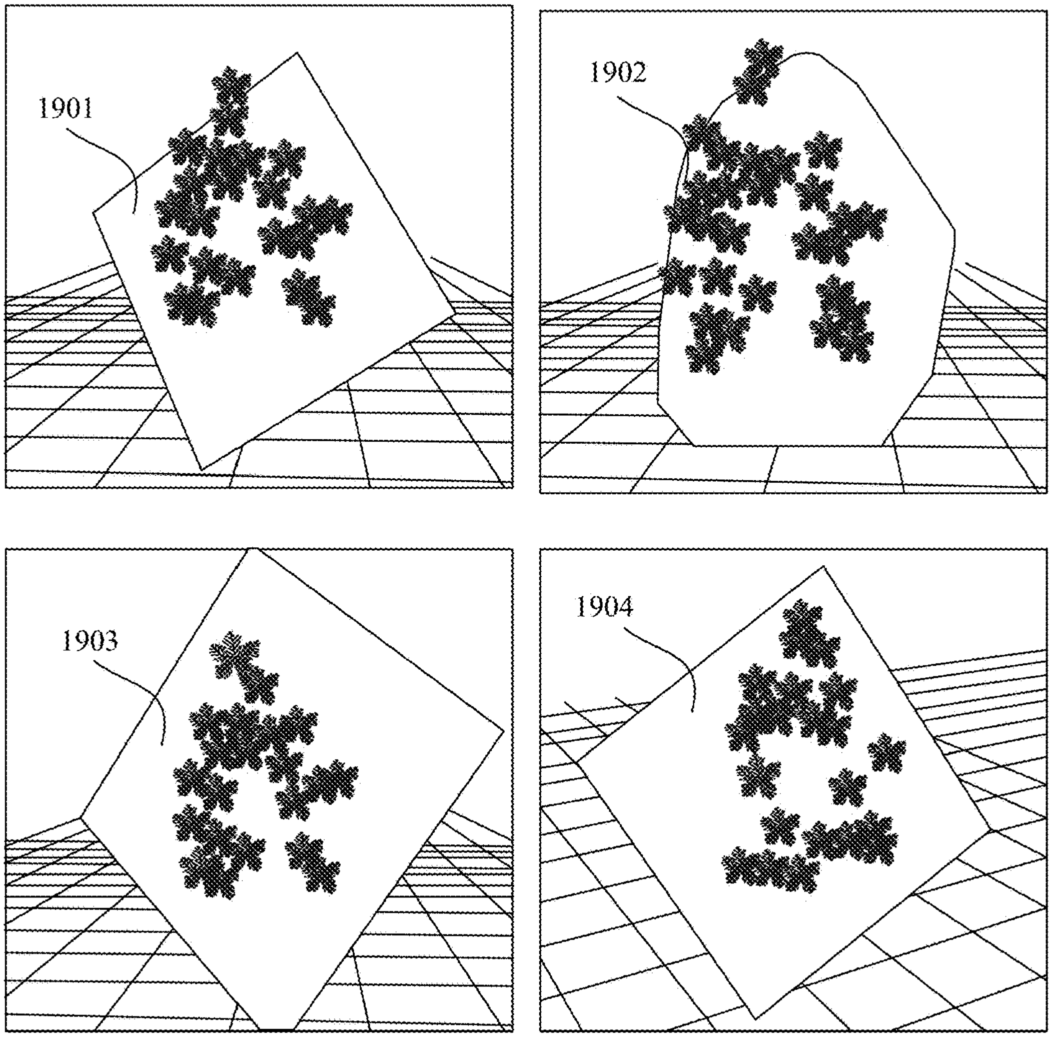
FIG. 19 is a schematic diagram of performing size matching on an initial orientation patch and an original object mesh model according to an embodiment.

In an embodiment, as shown in FIG. 19, the terminal may perform size matching on an initial orientation patch 1901 and the bounding box of the original object mesh model, to obtain an orientation patch 1902 after size matching. The terminal may determine a bounding box of the orientation patch 1902, and generate an orientation patch 1903 based on the bounding box of the orientation patch 1902. Further, the terminal performs size scaling on the orientation patch 1903, to obtain a target orientation patch 1904.

Figure 20:
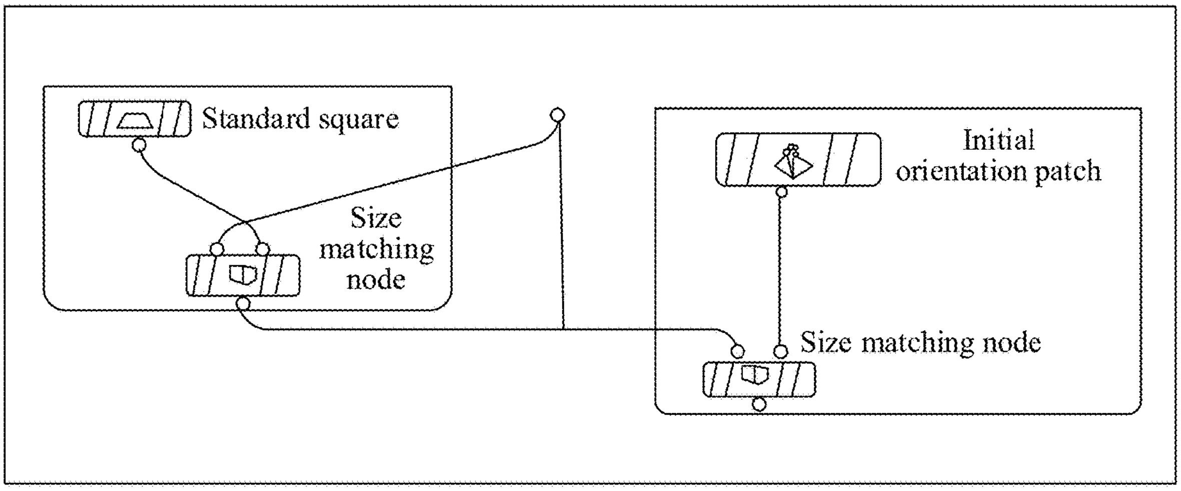
FIG. 20 is a schematic diagram of an interface of size matching according to an embodiment.

In an embodiment, model processing software is deployed in the terminal, the model processing software includes a plurality of nodes, and each node may perform corresponding processing on the model. As shown in FIG. 20, the terminal may first perform size scaling on an initial orientation patch by using a size matching node in the model processing software and using a preset standard square, to obtain an initially scaled orientation patch. Further, the terminal may further scale the initially scaled orientation patch by using another size matching node in the model processing software and using original size information of the standard square, to obtain a square target orientation patch. It may be understood that, the square target orientation patch may facilitate arranging patch map coordinate information thereof in a 0-1 space.

Figure 21:
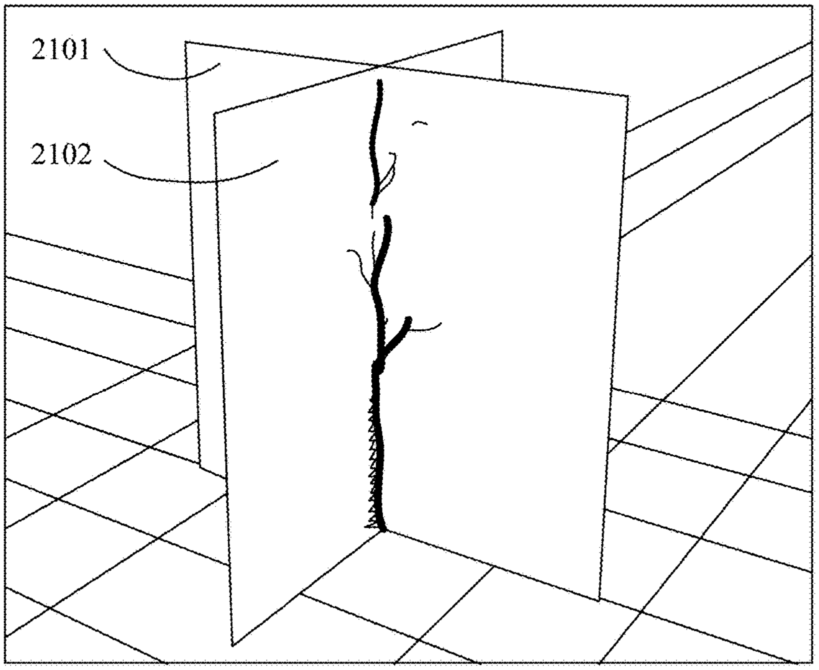
FIG. 21 is a schematic diagram of two initial orientation patches according to an embodiment.

In an embodiment, as shown in FIG. 21, if the virtual object is a virtual tree, the virtual tree may include a leaf and a trunk. The terminal may use two intersecting target orientation patches 2101 and 2102 to represent the trunk of the virtual tree.

Figure 22:
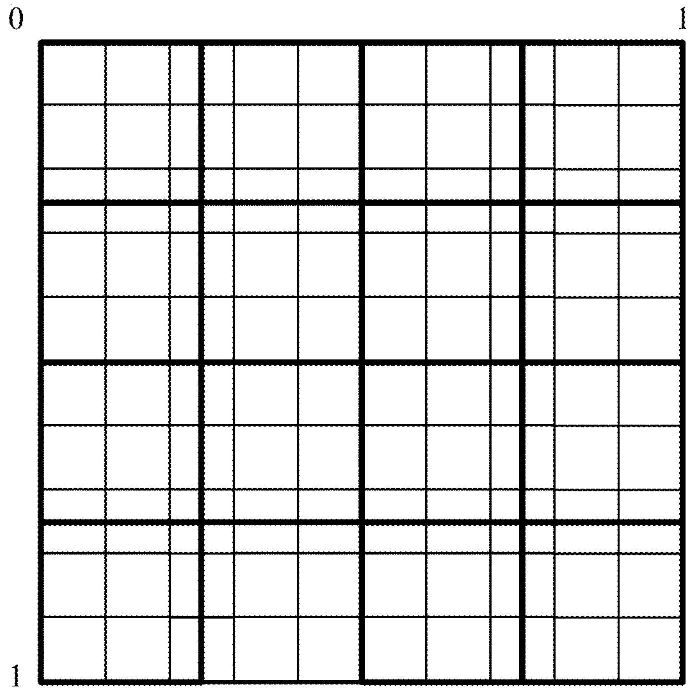
FIG. 22 is a schematic diagram of scaled and arranged patch map coordinate information according to an embodiment.
Figure 23:
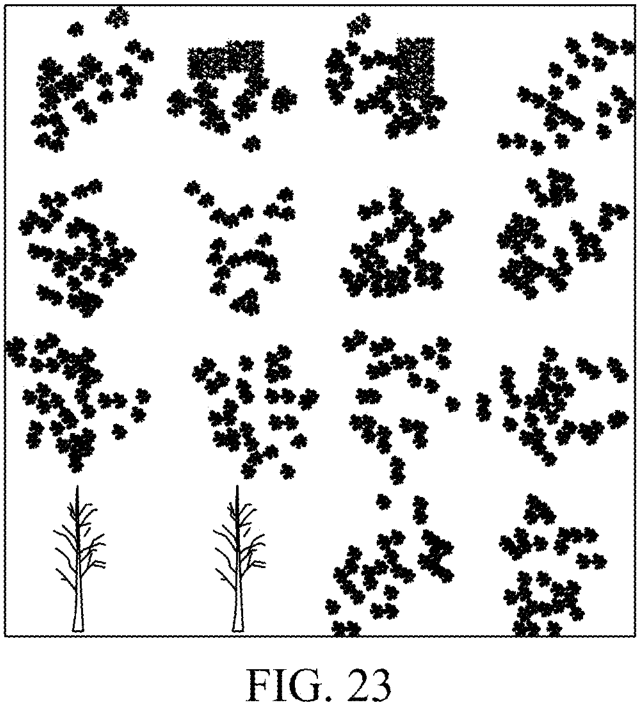
FIG. 23 is a schematic diagram of an insert model corresponding to an original object mesh model according to an embodiment.

In an embodiment, as shown in FIG. 22, the terminal may scale and arrange the patch map coordinate information of the target orientation patches in the 0-1 space. In other words, the patch map coordinate information of the target orientation patches is scaled and arranged in 16 squares in FIG. 22. Further, as shown in FIG. 23, the terminal may perform map baking according to the scaled and arranged patch map coordinate information, to obtain the insert model corresponding to the original object mesh model. If the virtual object is a virtual tree, the insert model includes inserts of 14 leaves and inserts of two trunks.

In the foregoing embodiment, by performing size matching on the initial orientation patches of the original object mesh model in the plurality of orientations and the original object mesh model, the target orientation patches that are in the plurality of orientations and match the original object mesh model in size may be obtained. By scaling and arranging the patch map coordinate information of the target orientation patches, the patch map coordinate information of the target orientation patches may be independent from each other. By performing map baking according to the scaled and arranged patch map coordinate information, maps for the orientations in the generated insert model may not be overlapped, which improves usability of the insert model.

In an embodiment, the performing size matching on the initial orientation patches and the original object mesh model, to obtain target orientation patches in the plurality of orientations includes: intersecting the initial orientation patches with a bounding box of the original object mesh model respectively, to obtain a plurality of intersected orientation patches; and determining the target orientation patches in the plurality of orientations according to the plurality of intersected orientation patches.

The intersected orientation patch is an orientation patch cropped by intersecting the initial orientation patch with the bounding box of the original object mesh model.

Specifically, the terminal may intersect the initial orientation patches with the bounding box of the original object mesh model respectively, to obtain the plurality of intersected orientation patches. Further, the terminal may determine the target orientation patches in the plurality of orientations according to the plurality of intersected orientation patches.

In an embodiment, the terminal may directly use the plurality of intersected orientation patches as the target orientation patches in the plurality of orientations.

Refer to FIG. 19 again. The terminal may intersect the initial orientation patch 1901 with the bounding box of the original object mesh model, to obtain an intersected orientation patch 1902. The terminal may determine a bounding box of the intersected orientation patch 1902, and generate a rectangular orientation patch 1903 based on the bounding box of the intersected orientation patch 1902. Further, the terminal performs size scaling on the rectangular orientation patch 1903, to obtain a square target orientation patch 1904.

In an embodiment, the intersected orientation patch may not be square, while a map coordinate area corresponding to the patch map coordinate information is square. Therefore, for ease of subsequent scaling and arranging for the patch map coordinate information, the terminal may transform the plurality of intersected orientation patches respectively into square orientation patches, and use the square orientation patches obtained through transformation as the target orientation patches in the plurality of orientations.

In the foregoing embodiment, by intersecting the initial orientation patches with the bounding box of the original object mesh model respectively, the plurality of intersected orientation patches that match the original object mesh model may be obtained, so that the target orientation patch that are in the plurality of orientations and match the original object mesh model in size may be determined according to the plurality of intersected orientation patches, which avoids a size mismatch between the virtual object obtained by subsequent rendering and the original virtual object, thereby further improving rendering effect of the virtual object.

In an embodiment, the insert model corresponding to the original object mesh model includes a target map; and the performing map baking according to scaled and arranged patch map coordinate information, to obtain the insert model corresponding to the original object mesh model includes:

performing map baking according to an original map of the original object mesh model and the scaled and arranged patch map coordinate information, to obtain a first insert map; inverting normals of the target orientation patches, and performing map baking according to orientation patches obtained after the inversion, to obtain a second insert map; and combining the first insert map and the second insert map, to obtain the target map.

The first insert map is an insert map obtained by direct map baking according to the original map of the original object mesh model and the scaled and arranged patch map coordinate information. The second insert map is an insert map obtained by map baking according to the inverted orientation patch.

Figure 24:
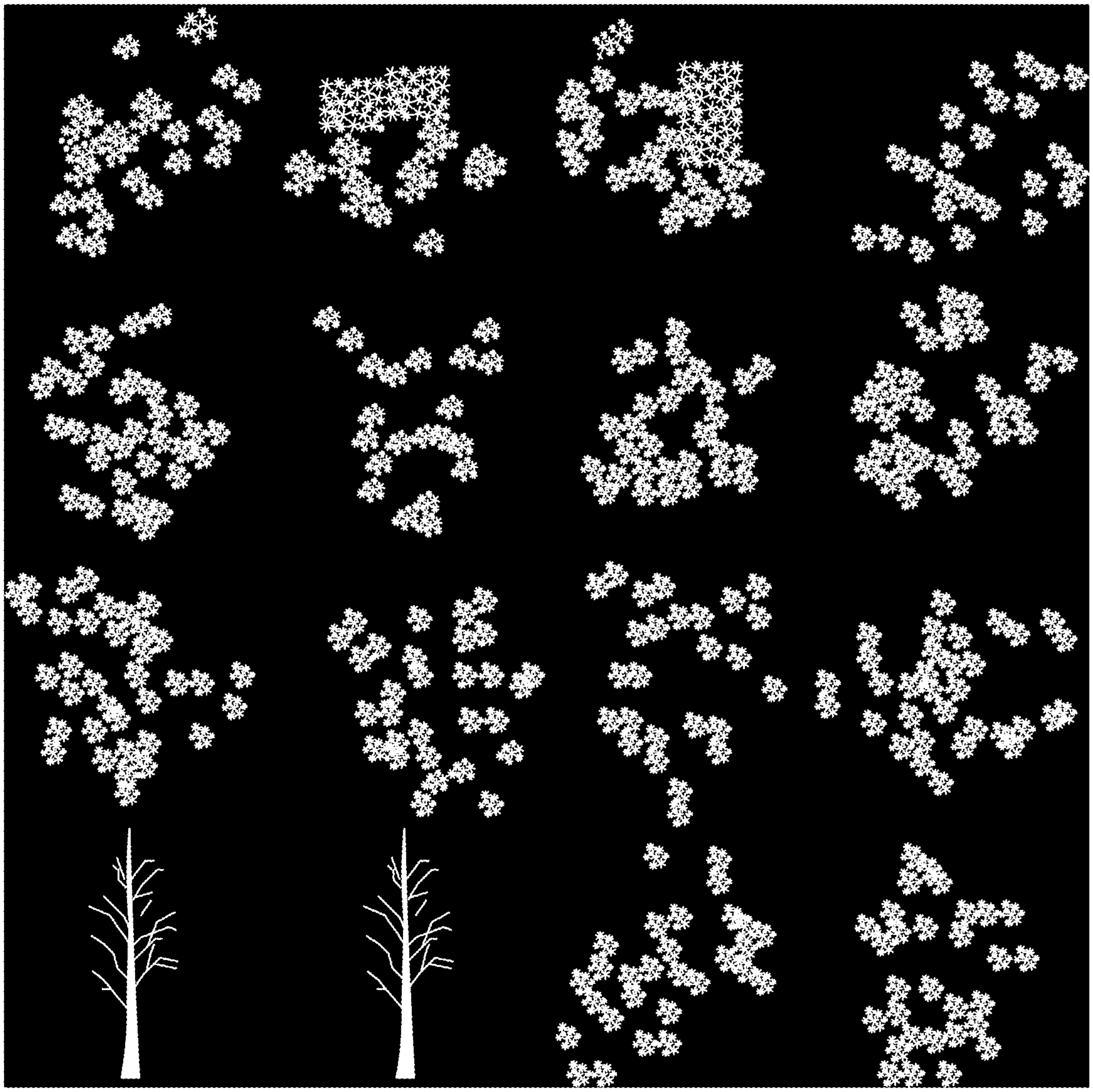
FIG. 24 is a schematic diagram of an insert model corresponding to an original object mesh model according to another embodiment.

Specifically, the terminal may obtain the original map of the original object mesh model, and directly perform map baking according to the original map of the original object mesh model and the scaled and arranged patch map coordinate information, to obtain the first insert map. Further, the terminal may invert the normal of the target orientation patch, and perform map baking again according to the inverted orientation patch, to obtain the second insert map. As shown in FIG. 24, the terminal may combine the first insert map and the second insert map, to obtain the target map.

In the foregoing embodiment, by performing map baking according to the original map of the original object mesh model and the scaled and arranged patch map coordinate information, the first insert map may be obtained. By inverting the normal of the target orientation patch, and performing map baking according to the inverted orientation patch, the second insert map may be obtained, so that by combining the first insert map and the second insert map, the target map may be obtained. In this way, object elements of the virtual object obtained by subsequent rendering may be prevented from being too sparse, and rendering effect of the virtual object is further improved.

In an embodiment, the virtual object includes a virtual tree in a game scene; the three-dimensional reconstructed mesh model includes a three-dimensional reconstructed tree model; and the three-dimensional reconstructed tree model is configured to obtain the virtual tree by rendering in the game scene.

The virtual tree is a virtual tree in the game scene.

In an embodiment, the original object mesh model includes an original tree mesh model. The terminal may transform the original tree mesh model located at an original model location in a world coordinate space to a model processing plane of the world coordinate space, to obtain a flattened flat mesh model located on the model processing plane. The original tree mesh model location is an original three-dimensional mesh model of a to-be-rendered virtual tree. The terminal may generate the patch model according to the bounding box patch of the flat mesh model. Topological reconstruction is performed on the patch model, to obtain a reconstructed mesh model located on the model processing plane, a quantity of surfaces of the reconstructed mesh model being less than a quantity of surfaces of the original tree mesh model. The terminal may transform the reconstructed mesh model to the original model location, to obtain a three-dimensional reconstructed tree model located at the original model location. The terminal may perform rendering according to the three-dimensional reconstructed tree model, to obtain the virtual tree.

In the foregoing embodiment, by rendering the three-dimensional reconstructed tree model, the virtual tree in the game scene may be obtained, which improves rendering effect of the virtual tree and makes the virtual tree more vivid and realistic in the game scene.

Figure 25:
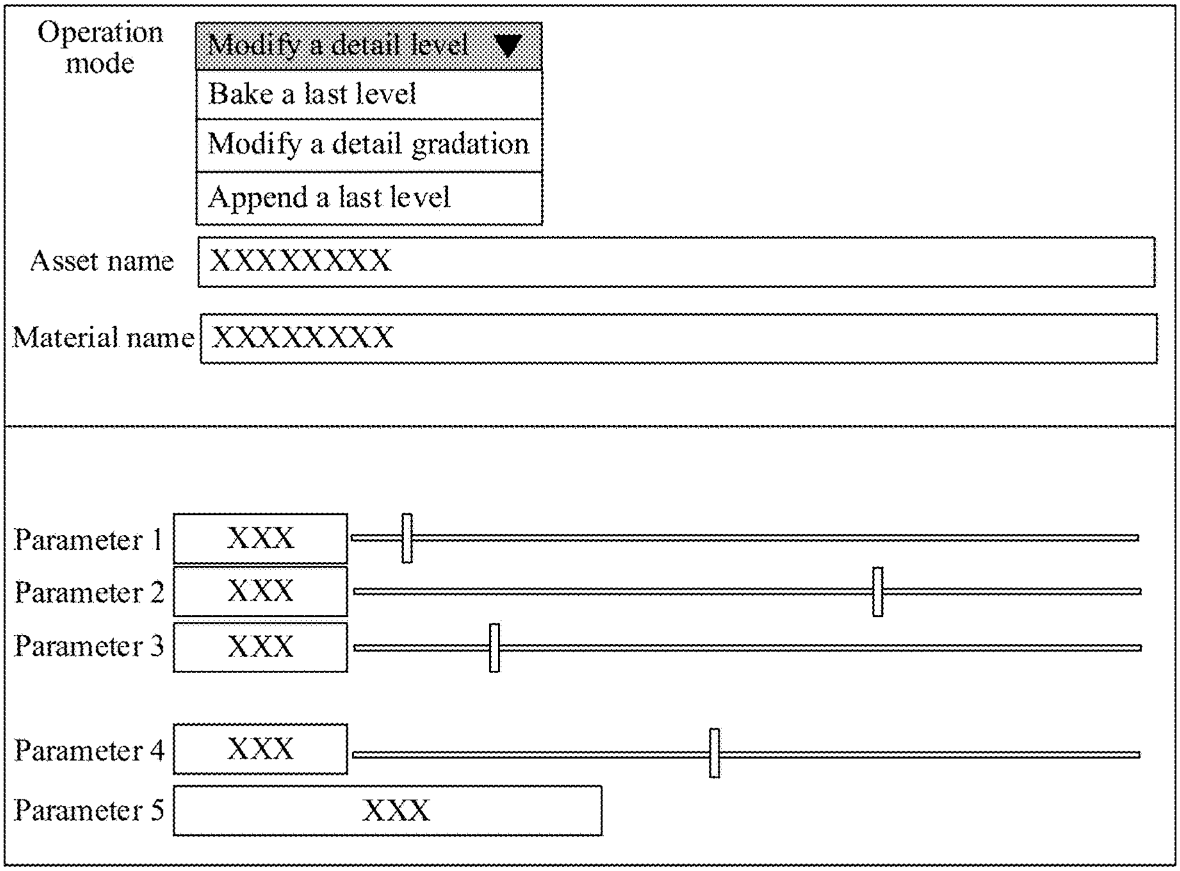
FIG. 25 is a schematic diagram of an interface operation of modifying an original object mesh model according to an embodiment.

In an embodiment, model processing software is deployed in the terminal, and a user may import the original object mesh model into the model processing software to process the original object mesh model. As shown in FIG. 25, the model processing software may include three operation modes, namely, baking a last level, modifying a detail gradation, and appending a last level, for the original object mesh model. The operation mode of baking a last level may be configured for generating the insert model corresponding to the original object mesh model. The operation mode of modifying a detail gradation may be configured for modifying (including performing surface reduction on a reconstructed model and a UI-reconstructed model) each level of the imported original object mesh model. The operation mode of appending a last level may be configured for appending to a last level of the original object mesh model based on the insert model generated and obtained through baking a last level, or appending to a last level of a modified model generated and obtained through modifying a detail gradation. It may be understood that, the model processing software in this application may simultaneously have functions of model reconstruction, surface reduction, and model insert generation. When the user performs related processing on the original object mesh model, all operations can be completed in the model processing software, and there is no need to frequently switch operations on a plurality of software.

Figure 26:
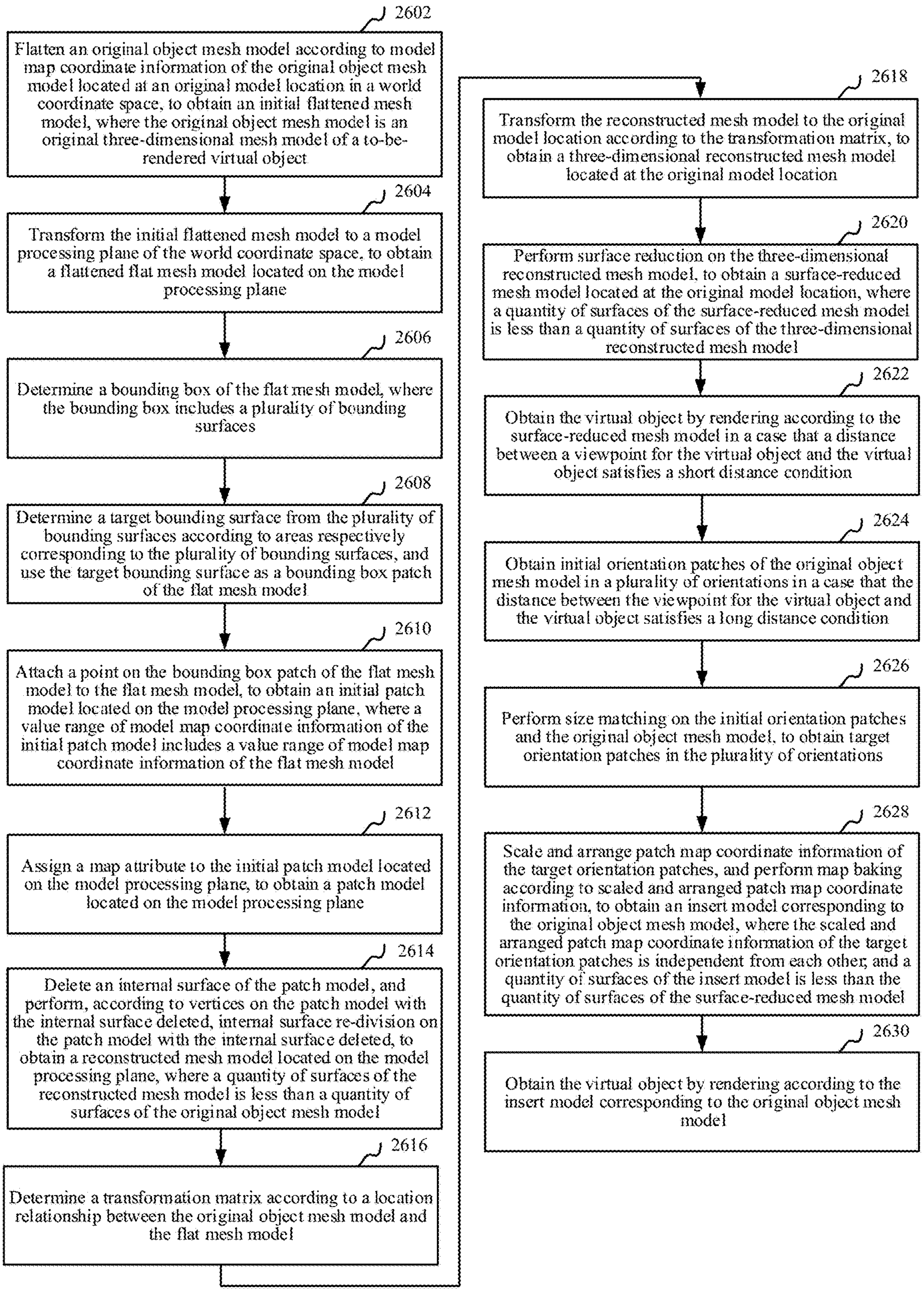
FIG. 26 is a schematic flowchart of an image rendering method according to another embodiment.

As shown in FIG. 26, in an embodiment, an image rendering method is provided, and is applied to the terminal 102 in FIG. 1. The method specifically includes the following steps.

Step 2602: Flatten an original object mesh model according to model map coordinate information of the original object mesh model located at an original model location in a world coordinate space, to obtain an initial flattened mesh model, where the original object mesh model is an original three-dimensional mesh model of a target virtual object.

Step 2604: Transform the initial flattened mesh model to a model processing plane of the world coordinate space, to obtain a flattened flat mesh model located on the model processing plane.

Step 2606: Determine a bounding box of the flat mesh model, where the bounding box includes a plurality of bounding surfaces.

Step 2608: Determine a target bounding surface from the plurality of bounding surfaces according to areas respectively corresponding to the plurality of bounding surfaces, and use the target bounding surface as a bounding box patch of the flat mesh model.

Step 2610: Attach a point on the bounding box patch of the flat mesh model to the flat mesh model, to obtain an initial patch model located on the model processing plane, where a value range of model map coordinate information of the initial patch model includes a value range of model map coordinate information of the flat mesh model.

Step 2612: Assign a map attribute to the initial patch model located on the model processing plane, to obtain a patch model located on the model processing plane.

Step 2614: Delete an internal surface of the patch model, and perform, according to vertices on the patch model with the internal surface deleted, internal surface re-division on the patch model with the internal surface deleted, to obtain a reconstructed mesh model located on the model processing plane, where a quantity of surfaces of the reconstructed mesh model is less than a quantity of surfaces of the original object mesh model.

Step 2616: Determine a transformation matrix according to a location relationship between the original object mesh model and the flat mesh model.

Step 2618: Transform the reconstructed mesh model to the original model location according to the transformation matrix, to obtain a three-dimensional reconstructed mesh model located at the original model location.

Step 2620: Perform surface reduction on the three-dimensional reconstructed mesh model, to obtain a surface-reduced mesh model located at the original model location, where a quantity of surfaces of the surface-reduced mesh model is less than a quantity of surfaces of the three-dimensional reconstructed mesh model.

Step 2622: Obtain the virtual object by rendering according to the surface-reduced mesh model when a distance between a viewpoint for the virtual object and the virtual object satisfies a short distance condition.

Step 2624: Obtain initial orientation patches of the original object mesh model in a plurality of orientations when the distance between the viewpoint for the virtual object and the virtual object satisfies a long distance condition.

Step 2626: Perform size matching on the initial orientation patches and the original object mesh model, to obtain target orientation patches in the plurality of orientations.

Step 2628: Scale and arrange patch map coordinate information of the target orientation patches, and perform map baking according to scaled and arranged patch map coordinate information, to obtain an insert model corresponding to the original object mesh model, where the scaled and arranged patch map coordinate information of the target orientation patches is independent from each other; and a quantity of surfaces of the insert model is less than the quantity of surfaces of the surface-reduced mesh model.

Step 2630: Obtain the virtual object by rendering according to the insert model corresponding to the original object mesh model.

This application further provides an application scenario, and the foregoing image rendering method is applied to the application scenario. Specifically, the image rendering method may be applied to a scene of generation of a virtual tree in a game. A terminal may flatten an original tree mesh model according to model map coordinate information of the original tree mesh model located at an original model location in a world coordinate space, to obtain an initial flattened mesh model, where the original tree mesh model is an original three-dimensional mesh model of a to-be-rendered virtual tree. The initial flattened mesh model is transformed to a model processing plane of the world coordinate space, to obtain a flattened flat mesh model located on the model processing plane.

The terminal may determine a bounding box of the flat mesh model, where the bounding box includes a plurality of bounding surfaces. A target bounding surface is determined from the plurality of bounding surfaces according to areas respectively corresponding to the plurality of bounding surfaces, and the target bounding surface is used as a bounding box patch of the flat mesh model. A point on the bounding box patch of the flat mesh model is attached to the flat mesh model, to obtain an initial patch model located on the model processing plane, where a value range of model map coordinate information of the initial patch model includes a value range of model map coordinate information of the flat mesh model. A map attribute is assigned to the initial patch model located on the model processing plane, to obtain a patch model located on the model processing plane.

The terminal may delete an internal surface of the patch model. According to vertices on the patch model with the internal surface deleted, internal surface re-division is performed on the patch model with the internal surface deleted, to obtain a reconstructed mesh model located on the model processing plane, where a quantity of surfaces of the reconstructed mesh model is less than a quantity of surfaces of the original tree mesh model. A transformation matrix is determined according to a location relationship between the original tree mesh model and the flat mesh model. The reconstructed mesh model is transformed to the original model location according to the transformation matrix, to obtain a three-dimensional reconstructed tree model located at the original model location. The terminal may perform surface reduction on the three-dimensional reconstructed tree model, to obtain a surface-reduced mesh model located at the original model location, where a quantity of surfaces of the surface-reduced mesh model is less than a quantity of surfaces of the three-dimensional reconstructed tree model.

The terminal may obtain the virtual tree by rendering according to the surface-reduced mesh model when a distance between a game player and the virtual tree is short. The terminal may obtain initial orientation patches of the original tree mesh model in a plurality of orientations when the distance between the game player and the virtual tree is long. Size matching is performed on the initial orientation patches and the original tree mesh model, to obtain target orientation patches in the plurality of orientations. Patch map coordinate information of the target orientation patches is scaled and arranged, and map baking is performed according to scaled and arranged patch map coordinate information, to obtain an insert model corresponding to the original tree mesh model, where the scaled and arranged patch map coordinate information of the target orientation patches is independent from each other; and a quantity of surfaces of the insert model is less than the quantity of surfaces of the surface-reduced mesh model. The virtual tree is obtained by rendering according to the insert model corresponding to the original tree mesh model.

The image rendering method in this application may be further applied to a scene such as film and television special effects, a visual design, virtual reality (VR), industrial simulation, or digital cultural creation. The digital cultural creation may specifically include a building, a tourist attraction, or the like that is obtained by rendering. It may be understood that, rendering for a virtual object may be involved in the scene such as the film and television special effects, the visual design, the VR, the industrial simulation, or the digital cultural creation. The virtual object may include at least one of a virtual character, a virtual animal, a virtual plant, a virtual thing, and the like. Rendering of the virtual object in each foregoing scene may be implemented by using the image rendering method in this application. For example, in the scene of the digital cultural creation, a case of rendering a building with a cultural representative significance, for example, rendering a museum or a historical building, may be involved. Rendering effect of the building or the like may be improved by using the image rendering method in this application, to obtain a more vivid and realistic digital cultural creation building. For another example, in the scene of the industrial simulation, simulation rendering of an industrial production environment, for example, a production workshop, an assembly line, or production equipment of a factory, may be involved. Rendering effect of an industrial simulation object may be improved by using the image rendering method in this application, to obtain a more accurate and referential industrial production simulation environment.

Although the steps in the flowcharts of the embodiments are displayed sequentially according to a sequence, these steps are not necessarily performed sequentially according to the sequence. Unless clearly specified in this specification, there is no strict sequence limitation on the execution of the steps, and the steps may be performed in another sequence. In addition, at least a part of the steps in the foregoing embodiments may comprise a plurality of substeps or a plurality of stages. These substeps or stages are not necessarily performed and completed at the same moment, and may be performed at different moments. Besides, the substeps or stages may not be necessarily performed sequentially, and may be performed in turn or alternately with other steps or at least a part of substeps or stages of other steps.

Figure 27:
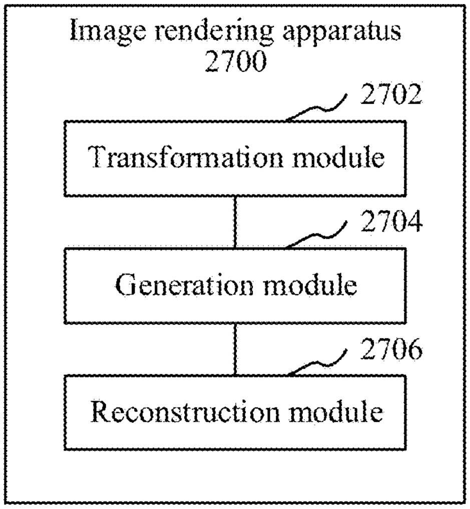
FIG. 27 is a block diagram of a structure of an image rendering apparatus according to an embodiment.

In an embodiment, as shown in FIG. 27, an image rendering apparatus 2700 is provided. The apparatus may use a software module or a hardware module or a combination of the two as a part of a computer device, and the apparatus specifically includes:

a transformation module, configured to flatten an original object mesh model to obtain a flat mesh model, the original object mesh model being an original three-dimensional mesh model of a target virtual object;

a generation module, configured to generate a patch model according to a bounding box patch of the flat mesh model; and a reconstruction module, configured to perform topological reconstruction on the patch model, to obtain a reconstructed mesh model, a quantity of surfaces of the reconstructed mesh model being less than a quantity of surfaces of the original object mesh model.

The transformation module is further configured to obtain a three-dimensional reconstructed mesh model based on the reconstructed mesh model, the three-dimensional reconstructed mesh model being configured to render the target virtual object.

In an embodiment, the transformation module is further configured to transform the original object mesh model located at an original model location in a world coordinate space to a model processing plane of the world coordinate space, to obtain a flattened flat mesh model located on the model processing plane; and transform the reconstructed mesh model to the original model location, to obtain the three-dimensional reconstructed mesh model located at the original model location.

In an embodiment, the transformation module is configured to flatten the original object mesh model according to model map coordinate information of the original object mesh model located at the original model location, to obtain an initial flattened mesh model; and transform the initial flattened mesh model to the model processing plane, to obtain the flattened flat mesh model located on the model processing plane.

In an embodiment, the generation module is further configured to: determine a bounding box of the flat mesh model, where the bounding box includes a plurality of bounding surfaces; and determine a target bounding surface from the plurality of bounding surfaces according to areas respectively corresponding to the plurality of bounding surfaces, and use the target bounding surface as the bounding box patch of the flat mesh model.

In an embodiment, the generation module is further configured to: attach a point on the bounding box patch of the flat mesh model to the flat mesh model, to obtain an initial patch model, where a value range of model map coordinate information of the initial patch model includes a value range of model map coordinate information of the flat mesh model; and assign a map attribute to the initial patch model, to obtain the patch model.

In an embodiment, the reconstruction module is further configured to: delete an internal surface of the patch model; and perform, according to vertices on the patch model with the internal surface deleted, internal surface re-division on the patch model with the internal surface deleted, to obtain the reconstructed mesh model.

In an embodiment, the transformation module is further configured to: determine a transformation matrix according to a location relationship between the original object mesh model and the flat mesh model; and transform the reconstructed mesh model to the original model location according to the transformation matrix, to obtain the three-dimensional reconstructed mesh model located at the original model location.

In an embodiment, the apparatus further includes:

a rendering module, configured to perform surface reduction on the three-dimensional reconstructed mesh model, to obtain a surface-reduced mesh model, where a quantity of surfaces of the surface-reduced mesh model is less than a quantity of surfaces of the three-dimensional reconstructed mesh model; and the surface-reduced mesh model is configured to render the target virtual object.

In an embodiment, the rendering module is further configured to: use the three-dimensional reconstructed mesh model as a new original object mesh model, and perform the operation of flattening an original object mesh model to obtain a flat mesh model and subsequent operations again, to obtain the surface-reduced mesh model.

In an embodiment, the rendering module is further configured to: perform direct surface reduction on the three-dimensional reconstructed mesh model, to obtain the surface-reduced mesh model.

In an embodiment, the apparatus further includes:

a rendering module, configured to: render the target virtual object according to the three-dimensional reconstructed mesh model when a distance between a viewpoint for the virtual object and the virtual object satisfies a short distance condition.

In an embodiment, the rendering module is further configured to: render the target virtual object according to an insert model corresponding to the original object mesh model when a distance between a viewpoint for the virtual object and the virtual object satisfies a long distance condition, where a quantity of surfaces of the insert model is less than a quantity of surfaces of the three-dimensional reconstructed mesh model.

In an embodiment, the rendering module is further configured to: determine that the viewpoint for the virtual object is located at an orientation of the virtual object; and determine, from the insert model corresponding to the original object mesh model, a map corresponding to the orientation, and render the target virtual object according to the determined map.

In an embodiment, the generation module is further configured to: obtain initial orientation patches of the original object mesh model in a plurality of orientations; perform size matching on the initial orientation patches and the original object mesh model, to obtain target orientation patches in the plurality of orientations; and scale and arrange patch map coordinate information of the target orientation patches, and perform map baking according to scaled and arranged patch map coordinate information, to obtain the insert model corresponding to the original object mesh model, where the scaled and arranged patch map coordinate information of the target orientation patches is independent from each other.

In an embodiment, the generation module is further configured to: intersect the initial orientation patches with a bounding box of the original object mesh model respectively, to obtain a plurality of intersected orientation patches; and determine the target orientation patches in the plurality of orientations according to the plurality of intersected orientation patches.

In an embodiment, the insert model corresponding to the original object mesh model includes a target map; and the generation module is further configured to: perform map baking according to an original map of the original object mesh model and the scaled and arranged patch map coordinate information, to obtain a first insert map; invert normals of the target orientation patches, and perform map baking according to orientation patches obtained after the inversion, to obtain a second insert map; and combine the first insert map and the second insert map, to obtain the target map.

In an embodiment, the virtual object includes a virtual tree in a game scene; the three-dimensional reconstructed mesh model includes a three-dimensional reconstructed tree model; and the three-dimensional reconstructed tree model is configured to obtain the virtual tree by rendering in the game scene.

In the foregoing image rendering apparatus, the flat mesh model is obtained after the original object mesh model is flattened. The patch model may be generated according to the bounding box patch of the flat mesh model. A value range of rendering information corresponding to the patch model includes a value range of rendering information corresponding to the original object mesh model. By performing topological reconstruction on the patch model, the reconstructed mesh model may be obtained. By transforming the reconstructed mesh model to the original model location, the three-dimensional reconstructed mesh model with less quantity of surfaces than the original object mesh model may be obtained, so that the virtual object may be obtained by rendering according to the three-dimensional reconstructed mesh model. Because the three-dimensional reconstructed mesh model is obtained through topological reconstruction according to the foregoing patch model, a value range of rendering information corresponding to the three-dimensional reconstructed mesh model also includes the value range of the rendering information corresponding to the original object mesh model. In this way, because the quantity of surfaces of the reconstructed mesh model is less than the quantity of surfaces of the original object mesh model, and compared with the original object mesh model, the rendering information of the three-dimensional reconstructed mesh model is not reduced, a model detail can be retained during surface reduction. Therefore, compared with a conventional manner of directly performing surface reduction on a model, in the image rendering method of this application, a detail of the model can be retained to a maximum extent while reconstruction and surface reduction are performed on the model to reduce a rendering resource, so that a more vivid and realistic virtual object is obtained by rendering, thereby improving image rendering effect.

The modules in the foregoing image rendering apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In an embodiment, a computer device is provided. The computer device may be a terminal, and an internal structure diagram thereof may be shown in FIG. 28. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured for information exchange between the processor and an external device. The communication interface of the computer device is configured to communicate with an external terminal in a wired or wireless manner. The wireless communication may be implemented by Wi-Fi, a mobile cellular network, NFC (Near Field Communication), or another technology. The computer-readable instructions are executed to implement an image rendering method. The display unit of the computer device is configured to form a visually visible picture, and may be a display screen, a projection apparatus, or a virtual reality imaging apparatus. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 28:
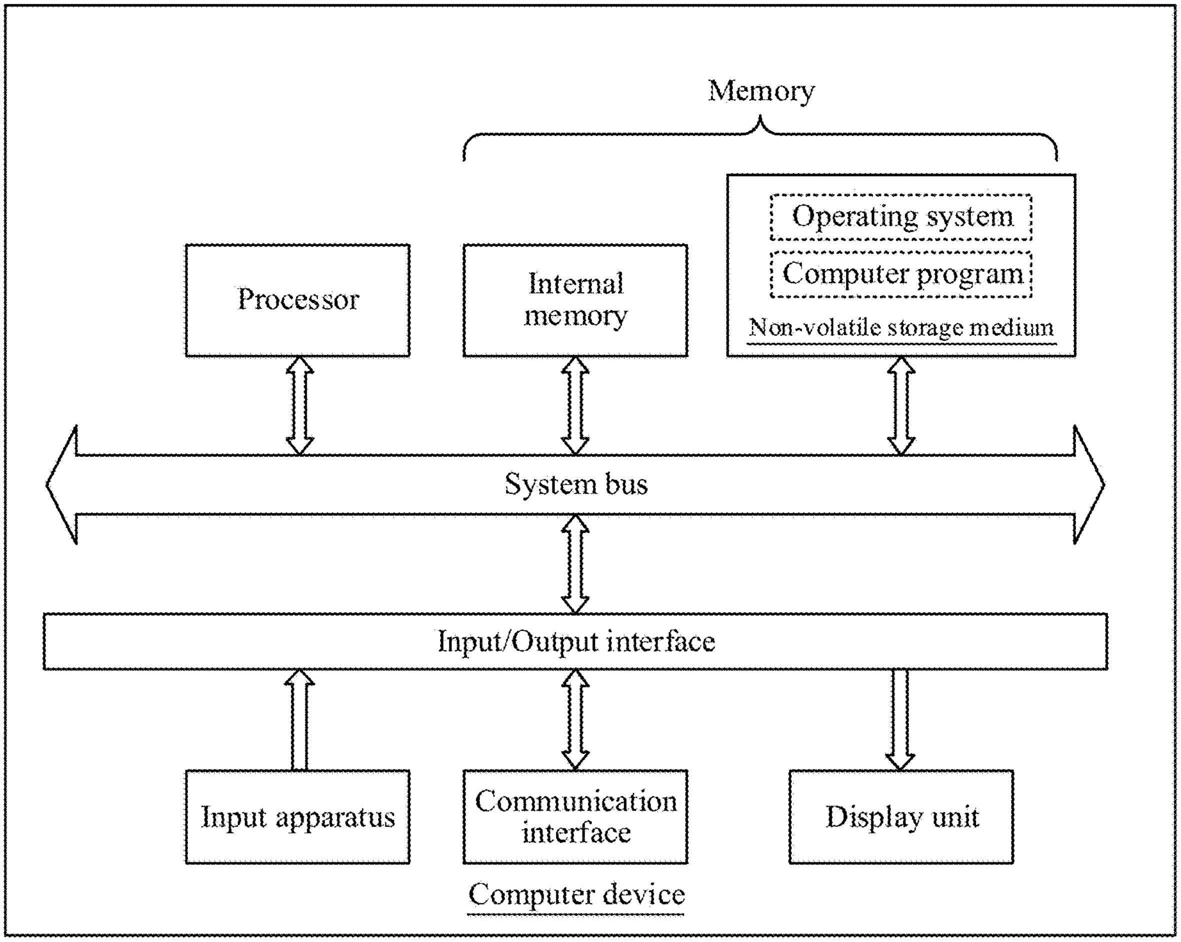
FIG. 28 is a diagram of an internal structure of a computer device according to an embodiment.

A person skilled in the art may understand that, the structure shown in FIG. 28 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is further provided, including a memory and one or more processors, the memory storing computer-readable instructions, and the steps in the foregoing method embodiments being implemented when the one or more processors execute the computer-readable instructions.

In an embodiment, one or more computer-readable storage media are provided, storing computer-readable instructions, and the steps in the foregoing method embodiments being implemented when the computer-readable instructions are executed by one or more processors.

In an embodiment, a computer program product is provided, storing computer-readable instructions, and the steps in the foregoing method embodiments being implemented when the computer-readable instructions are executed by one or more processors.

User information (including but not limited to user device information, user personal information, and the like) and data (including but not limited to data used for analysis, stored data, displayed data, and the like) involved in this application are authorized by the user or fully authorized by all parties, and the collection, use and processing of relevant data need to comply with relevant laws, regulations and standards of relevant countries and regions.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static random access memory (SRAM) or a dynamic random access memory (DRAM).

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application and the description are specific and detailed, but they are not to be understood as a limitation to the patent scope of the disclosure. A person of ordinary skill in the art may further make variations and improvements without departing from the concept of this application, and these shall all fall within the protection scope of this application. Therefore, the protection scope of this application shall be subject to the appended claims.

What is claimed is:

1. An image rendering method, performed by a computer device, the method comprising:
   - flattening an original object mesh model to obtain a flat mesh model, the original object mesh model being an original three-dimensional mesh model of a target virtual object;
   - generating a patch model according to a bounding box patch of the flat mesh model, further including:
     - merging a vertex on the bounding box patch to a corresponding closest vertex on the flat mesh model, wherein the patch model includes a plurality of edges defining a perimeter of the patch model and a plurality of internal surfaces sharing a common vertex within the perimeter of the patch model;
   - performing topological reconstruction on the patch model, to obtain a reconstructed mesh model, a quantity of surfaces of the reconstructed mesh model being less than a quantity of surfaces of the original object mesh model, further comprising:
     - replacing the plurality of internal surfaces of the patch model with a plurality of edge surfaces of the patch model, wherein each edge surface has all vertexes located on the plurality of edges of the patch model, wherein a quantity of the plurality of edge surfaces of the patch model is less than a quantity of the plurality of internal surfaces of the patch model; and
     - generating the reconstructed mesh model from the plurality of edge surfaces of the patch model;
   - reconstructing a three-dimensional mesh model based on the reconstructed mesh model; and
   - rendering multiple instances of the target virtual object from the three-dimensional reconstructed mesh model according to respective distances between a viewpoint for the virtual object and the virtual object, wherein the multiple instances of the target virtual object have different levels of details in the rendered target virtual object corresponding to the respective distances between the viewpoint for the virtual object and the virtual object.

2. The method according to claim 1, wherein the flattening an original object mesh model to obtain a flat mesh model comprises:
   - transforming the original object mesh model located at an original model location in a world coordinate space to a model processing plane of the world coordinate space, to obtain a flattened flat mesh model located on the model processing plane; and
   - transforming the reconstructed mesh model to the original model location, to obtain the three-dimensional reconstructed mesh model located at the original model location.

3. The method according to claim 1, wherein the method further comprises:
   - determining a bounding box of the flat mesh model, wherein the bounding box comprises a plurality of bounding surfaces; and
   - determining a target bounding surface from the plurality of bounding surfaces according to areas respectively corresponding to the plurality of bounding surfaces, and using the target bounding surface as the bounding box patch of the flat mesh model.

4. The method according to claim 1, wherein the generating a patch model according to a bounding box patch of the flat mesh model comprises:
   - attaching a point on the bounding box patch of the flat mesh model to the flat mesh model, to obtain an initial patch model, wherein a value range of model map coordinate information of the initial patch model comprises a value range of model map coordinate information of the flat mesh model; and
   - assigning a map attribute to the initial patch model, to obtain the patch model.

5. The method according to claim 1, wherein the method further comprises:
   - performing surface reduction on the three-dimensional reconstructed mesh model, to obtain a surface-reduced mesh model, wherein a quantity of surfaces of the surface-reduced mesh model is less than a quantity of surfaces of the three-dimensional reconstructed mesh model; and the surface-reduced mesh model is configured to render the target virtual object.

6. The method according to claim 1, wherein the rendering multiple instances of the target virtual object from the three-dimensional reconstructed mesh model according to respective distances between a viewpoint for the virtual object and the virtual object further comprises:

rendering the multiple instances of the target virtual object from the three-dimensional reconstructed mesh model according to an insert model corresponding to the original object mesh model, wherein a quantity of surfaces of the insert model is less than a quantity of surfaces of the three-dimensional reconstructed mesh model.

7. The method according to claim 1, wherein the target virtual object comprises a virtual tree in a game scene; the three-dimensional reconstructed mesh model comprises a three-dimensional reconstructed tree model; and the three-dimensional reconstructed tree model is configured to obtain the virtual tree by rendering in the game scene.

8. A computer device, comprising a memory and one or more processors, the memory storing computer-readable instructions that, when executed by the one or more processors, cause the computer device to perform an image rendering method including:

flattening an original object mesh model to obtain a flat mesh model, the original object mesh model being an original three-dimensional mesh model of a target virtual object;

generating a patch model according to a bounding box patch of the flat mesh model, further including:

merging a vertex on the bounding box patch to a corresponding closest vertex on the flat mesh model, wherein the patch model includes a plurality of edges defining a perimeter of the patch model and a plurality of internal surfaces sharing a common vertex within the perimeter of the patch model;

performing topological reconstruction on the patch model, to obtain a reconstructed mesh model, a quantity of surfaces of the reconstructed mesh model being less than a quantity of surfaces of the original object mesh model, further comprising:

replacing the plurality of internal surfaces of the patch model with a plurality of edge surfaces of the patch model, wherein each edge surface has all vertexes located on the plurality of edges of the patch model, wherein a quantity of the plurality of edge surfaces of the patch model is less than a quantity of the plurality of internal surfaces of the patch model; and generating the reconstructed mesh model from the plurality of edge surfaces of the patch model;

reconstructing a three-dimensional mesh model based on the reconstructed mesh model; and rendering multiple instances of the target virtual object from the three-dimensional reconstructed mesh model according to respective distances between a viewpoint for the virtual object and the virtual object, wherein the multiple instances of the target virtual object have different levels of details in the rendered target virtual object corresponding to the respective distances between the viewpoint for the virtual object and the virtual object.

9. The computer device according to claim 8, wherein the flattening an original object mesh model to obtain a flat mesh model comprises:

transforming the original object mesh model located at an original model location in a world coordinate space to a model processing plane of the world coordinate space, to obtain a flattened flat mesh model located on the model processing plane; and transforming the reconstructed mesh model to the original model location, to obtain the three-dimensional reconstructed mesh model located at the original model location.

10. The computer device according to claim 8, wherein the method further comprises:

determining a bounding box of the flat mesh model, wherein the bounding box comprises a plurality of bounding surfaces; and determining a target bounding surface from the plurality of bounding surfaces according to areas respectively corresponding to the plurality of bounding surfaces, and using the target bounding surface as the bounding box patch of the flat mesh model.

11. The computer device according to claim 8, wherein the generating a patch model according to a bounding box patch of the flat mesh model comprises:

attaching a point on the bounding box patch of the flat mesh model to the flat mesh model, to obtain an initial patch model, wherein a value range of model map coordinate information of the initial patch model comprises a value range of model map coordinate information of the flat mesh model; and assigning a map attribute to the initial patch model, to obtain the patch model.

12. The computer device according to claim 8, wherein the method further comprises:

performing surface reduction on the three-dimensional reconstructed mesh model, to obtain a surface-reduced mesh model, wherein a quantity of surfaces of the surface-reduced mesh model is less than a quantity of surfaces of the three-dimensional reconstructed mesh model; and the surface-reduced mesh model is configured to render the target virtual object.

13. The computer device according to claim 8, wherein the rendering multiple instances of the target virtual object from the three-dimensional reconstructed mesh model according to respective distances between a viewpoint for the virtual object and the virtual object further comprises:

rendering the multiple instances of the target virtual object from the three-dimensional reconstructed mesh model according to an insert model corresponding to the original object mesh model, wherein a quantity of surfaces of the insert model is less than a quantity of surfaces of the three-dimensional reconstructed mesh model.

14. The computer device according to claim 8, wherein the target virtual object comprises a virtual tree in a game scene; the three-dimensional reconstructed mesh model comprises a three-dimensional reconstructed tree model; and the three-dimensional reconstructed tree model is configured to obtain the virtual tree by rendering in the game scene.

15. One or more non-transitory computer-readable storage medium, storing computer-readable instructions that, when executed by one or more processors of a computer device, cause the computer device to perform an image rendering method including:

flattening an original object mesh model to obtain a flat mesh model, the original object mesh model being an original three-dimensional mesh model of a target virtual object;

generating a patch model according to a bounding box patch of the flat mesh model, further including:

merging a vertex on the bounding box patch to a corresponding closest vertex on the flat mesh model, wherein the patch model includes a plurality of edges defining a perimeter of the patch model and a plurality of internal surfaces sharing a common vertex within the perimeter of the patch model;

performing topological reconstruction on the patch model, to obtain a reconstructed mesh model, a quantity of surfaces of the reconstructed mesh model being less than a quantity of surfaces of the original object mesh model, further comprising:

replacing the plurality of internal surfaces of the patch model with a plurality of edge surfaces of the patch model, wherein each edge surface has all vertexes located on the plurality of edges of the patch model, wherein a quantity of the plurality of edge surfaces of the patch model is less than a quantity of the plurality of internal surfaces of the patch model; and generating the reconstructed mesh model from the plurality of edge surfaces of the patch model;

reconstructing a three-dimensional mesh model based on the reconstructed mesh model; and rendering multiple instances of the target virtual object from the three-dimensional reconstructed mesh model according to respective distances between a viewpoint for the virtual object and the virtual object, wherein the multiple instances of the target virtual object have different levels of details in the rendered target virtual object corresponding to the respective distances between the viewpoint for the virtual object and the virtual object.

16. The non-transitory computer-readable storage medium according to claim 15, wherein the flattening an original object mesh model to obtain a flat mesh model comprises:

transforming the original object mesh model located at an original model location in a world coordinate space to a model processing plane of the world coordinate space, to obtain a flattened flat mesh model located on the model processing plane; and transforming the reconstructed mesh model to the original model location, to obtain the three-dimensional reconstructed mesh model located at the original model location.

17. The non-transitory computer-readable storage medium according to claim 15, wherein the method further comprises:

performing surface reduction on the three-dimensional reconstructed mesh model, to obtain a surface-reduced mesh model, wherein a quantity of surfaces of the surface-reduced mesh model is less than a quantity of surfaces of the three-dimensional reconstructed mesh model; and the surface-reduced mesh model is configured to render the target virtual object.

18. The non-transitory computer-readable storage medium according to claim 15, wherein the rendering multiple instances of the target virtual object from the three-dimensional reconstructed mesh model according to respective distances between a viewpoint for the virtual object and the virtual object further comprises:

rendering the multiple instances of the target virtual object from the three-dimensional reconstructed mesh model according to an insert model corresponding to the original object mesh model, wherein a quantity of surfaces of the insert model is less than a quantity of surfaces of the three-dimensional reconstructed mesh model.

* * * * *